(12) United States Patent
Kobayashi

(10) Patent No.: US 10,447,918 B2
(45) Date of Patent: Oct. 15, 2019

(54) IMAGING CONTROL APPARATUS AND METHOD FOR CONTROLLING THE SAME

(71) Applicant: CANON KABUSHIKI KAISHA, Tokyo (JP)

(72) Inventor: Seiji Kobayashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/847,321

(22) Filed: Dec. 19, 2017

(65) Prior Publication Data

US 2018/0183993 A1    Jun. 28, 2018

(30) Foreign Application Priority Data

Dec. 27, 2016   (JP) .................. 2016-254229

(51) Int. Cl.
```
H04N 5/232      (2006.01)
H04N 5/262      (2006.01)
G06F 3/041      (2006.01)
G06F 3/0488     (2013.01)
```

(52) U.S. Cl.
CPC ....... *H04N 5/23216* (2013.01); *G06F 3/0416* (2013.01); *G06F 3/04883* (2013.01); *H04N 5/232127* (2018.08); *H04N 5/232933* (2018.08); *H04N 5/232935* (2018.08); *H04N 5/232939* (2018.08); *H04N 5/2624* (2013.01); *G06F 2203/04104* (2013.01); *G06F 2203/04803* (2013.01); *G06F 2203/04806* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 8,208,056 B2 | 6/2012 | Fujio et al. |
| 8,704,856 B2 | 4/2014 | Misawa et al. |
| 9,001,255 B2 | 4/2015 | Matsuzawa et al. |
| 9,323,432 B2 | 4/2016 | Kang et al. |
| 10,015,404 B2 | 7/2018 | Hara |
| 2005/0219393 A1 | 10/2005 | Sugimoto |

(Continued)

FOREIGN PATENT DOCUMENTS

| | | |
|---|---|---|
| JP | 2012-060567 A | 3/2012 |
| JP | 2016-163104 A | 9/2016 |

*Primary Examiner* — Sinh Tran
*Assistant Examiner* — Quan Pham
(74) *Attorney, Agent, or Firm* — Canon U.S.A., Inc. IP Division

(57) ABSTRACT

A method for processing in 2-area enlargement display with high operability through touch operations. Upon a move operation in a horizontal direction while in contact with a display unit, if the first and the second imaging areas respectively corresponding to ranges displayed in a first and a second display area in the 2-area enlargement display are separated from each other, control is performed to change a position of the first imaging area and not to change a position of the second imaging area in response to the move operation. Upon the move operation in the horizontal direction, if the second imaging area adjoins the first imaging area in a direction in which the first imaging area is to be moved by the move operation, control is performed to change the positions of the first and the second imaging areas in response to the move operation.

17 Claims, 9 Drawing Sheets

(56) References Cited

U.S. PATENT DOCUMENTS

| | | | |
|---|---|---|---|
| 2007/0242143 A1 | 10/2007 | Sugimoto | |
| 2007/0285534 A1 | 12/2007 | Makioka | |
| 2008/0025712 A1* | 1/2008 | Furuya | G03B 17/18 396/88 |
| 2009/0153722 A1* | 6/2009 | Fujio | H04N 5/23293 348/333.12 |
| 2012/0229675 A1* | 9/2012 | Yamamoto | H04N 5/23293 348/231.99 |
| 2013/0155308 A1* | 6/2013 | Wu | G06T 3/00 348/333.05 |
| 2013/0300674 A1* | 11/2013 | Davidson | G06F 3/04883 345/173 |
| 2014/0160233 A1* | 6/2014 | Ishida | H04N 5/2258 348/36 |
| 2015/0264253 A1 | 9/2015 | Takagi | |
| 2016/0044235 A1* | 2/2016 | Cho | H04M 1/0264 348/333.05 |
| 2016/0295130 A1* | 10/2016 | Molgaard | H04N 1/215 |
| 2017/0034428 A1* | 2/2017 | Kwon | G06F 3/04817 |
| 2017/0034449 A1* | 2/2017 | Eum | H04N 5/2258 |
| 2017/0054913 A1 | 2/2017 | Hara | |
| 2017/0199620 A1 | 7/2017 | Ishitsuka | |
| 2017/0278217 A1 | 9/2017 | Takahashi | |
| 2017/0318226 A1* | 11/2017 | Jung | H04N 5/265 |
| 2018/0013957 A1* | 1/2018 | Irie | G06F 3/0488 |
| 2018/0183996 A1 | 6/2018 | Takahashi | |

\* cited by examiner

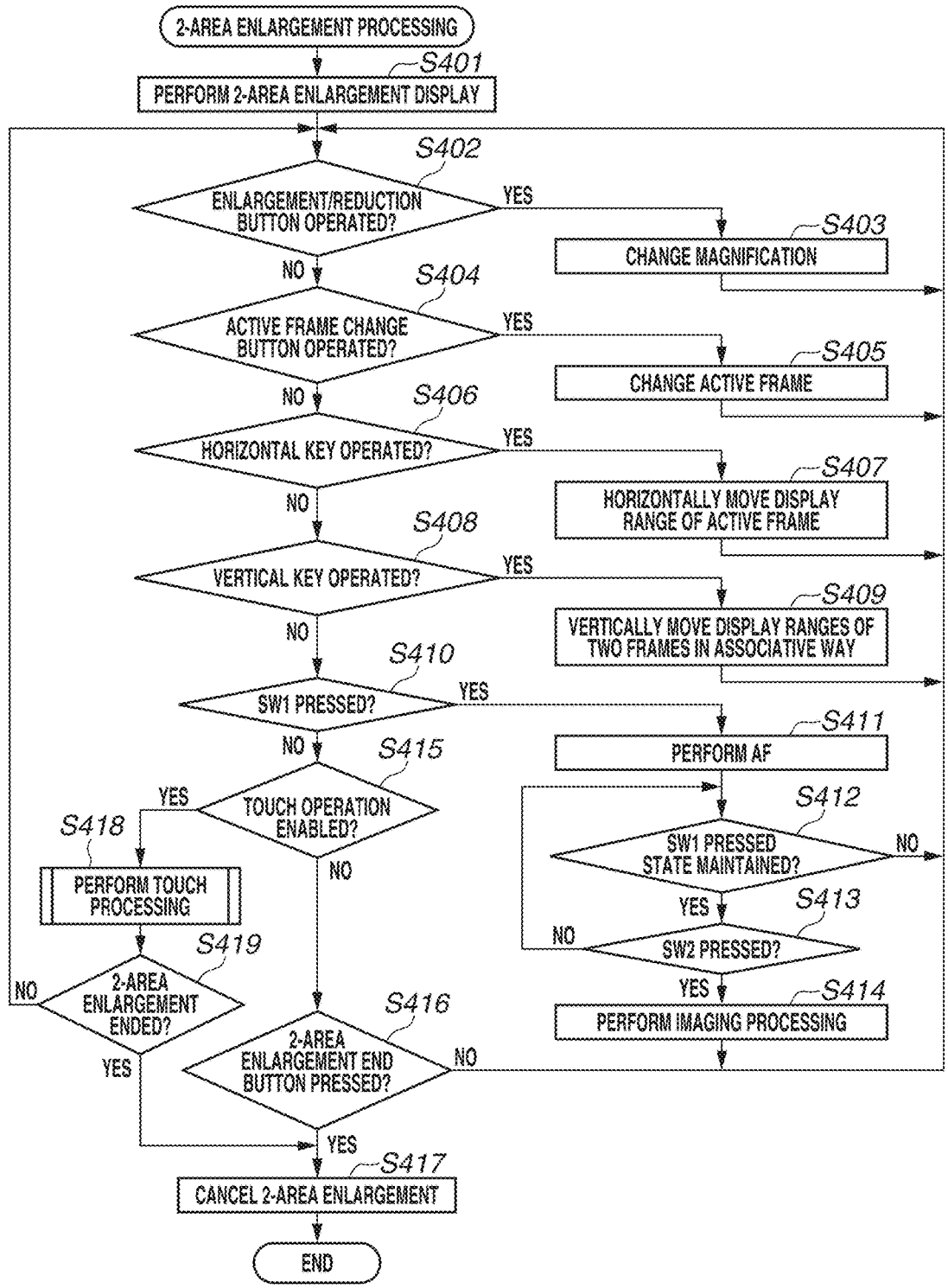

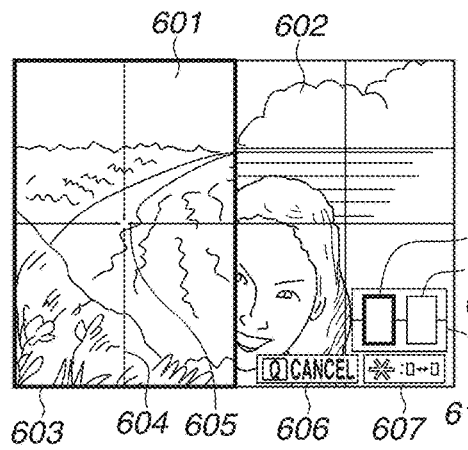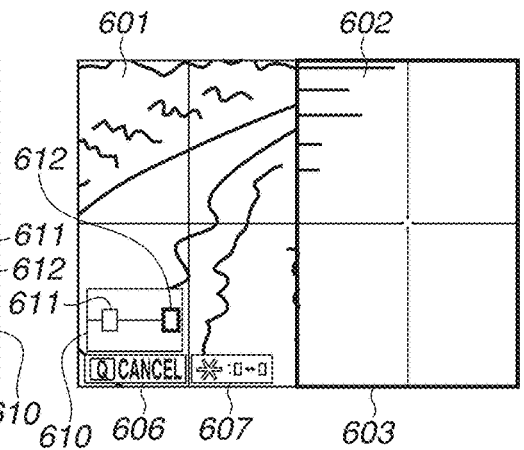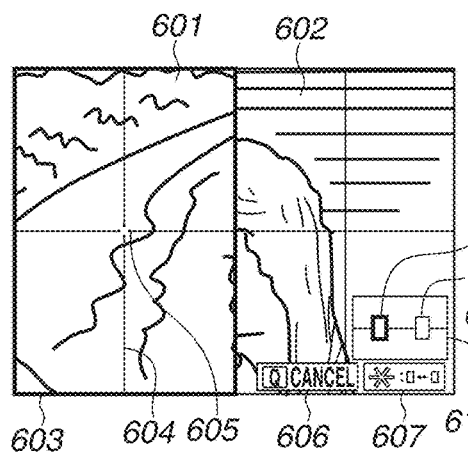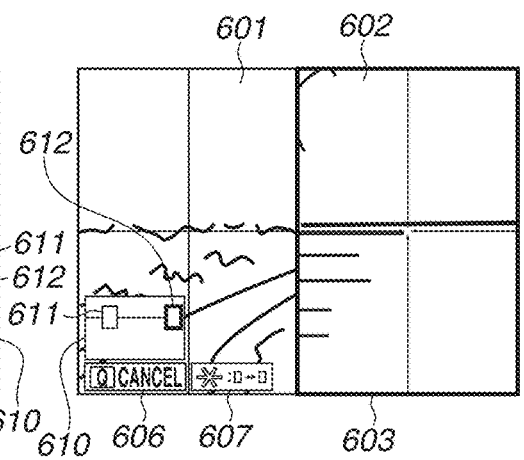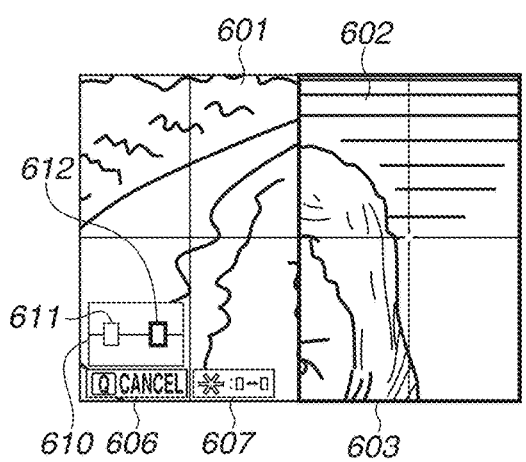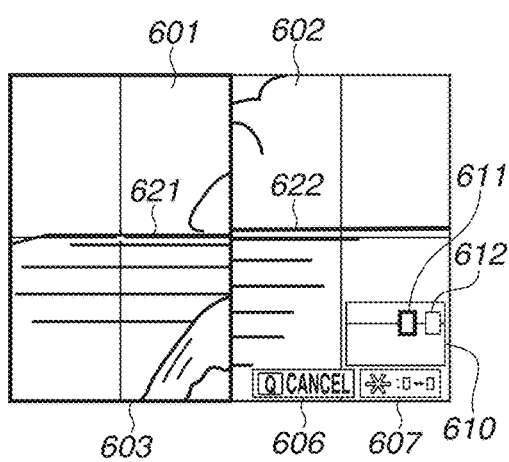

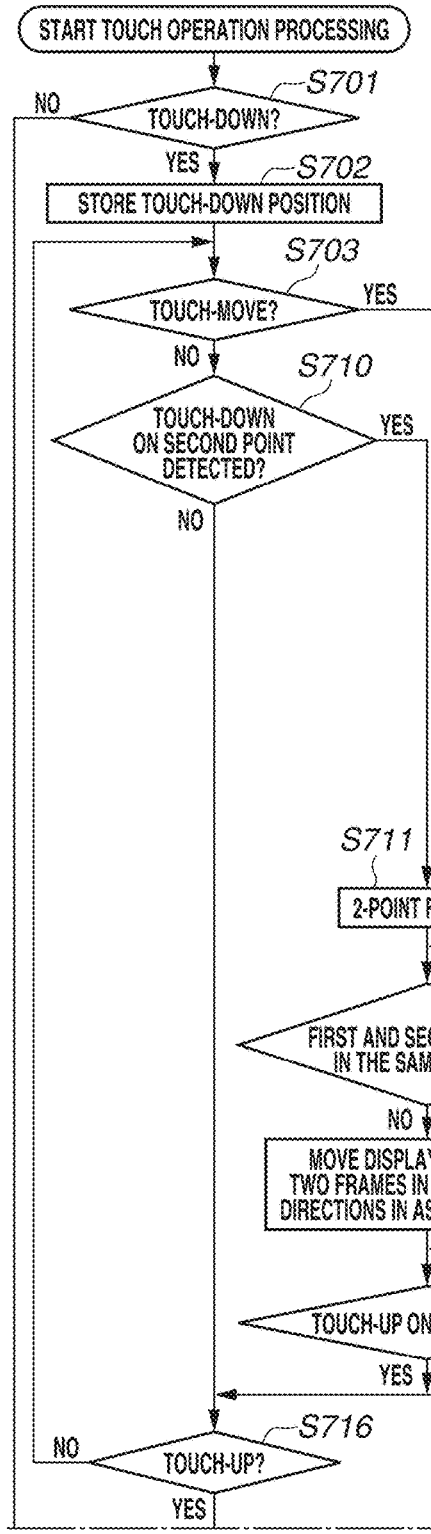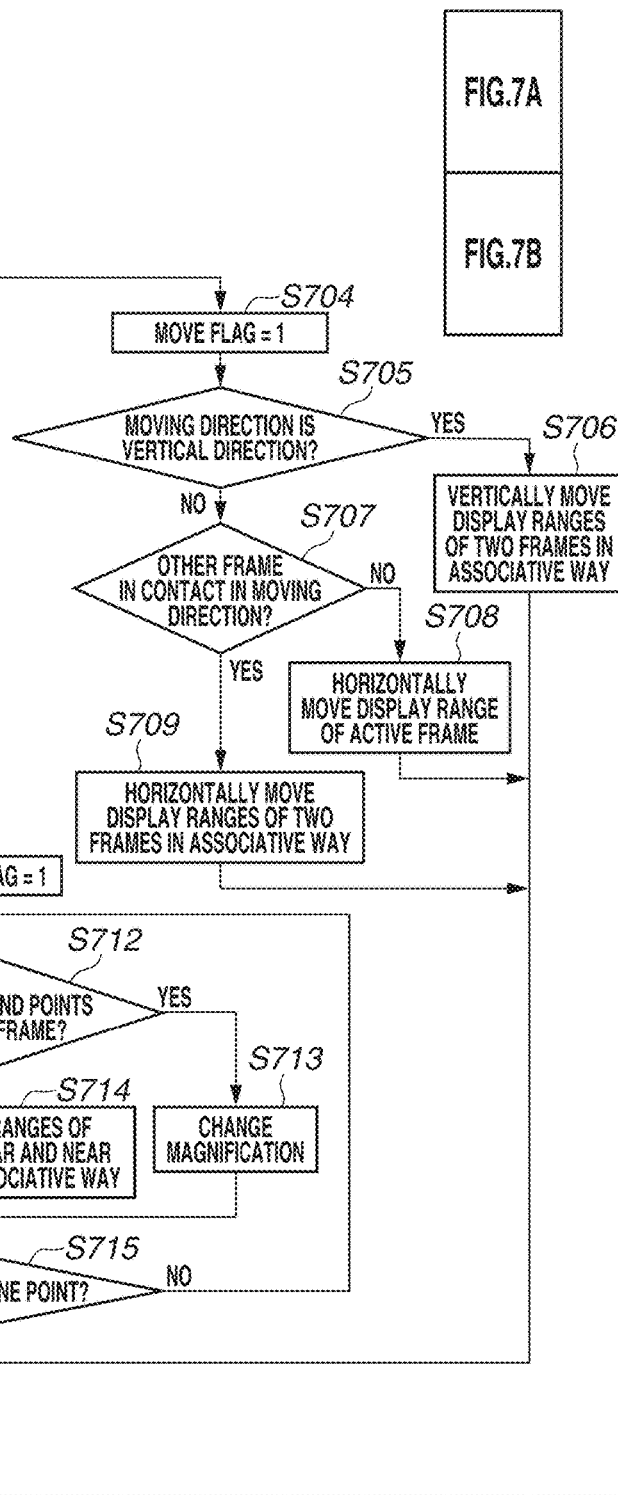

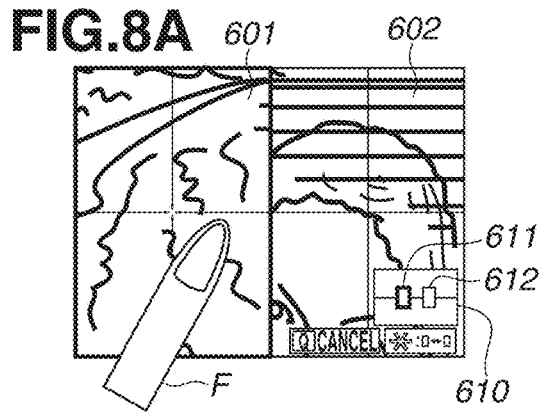
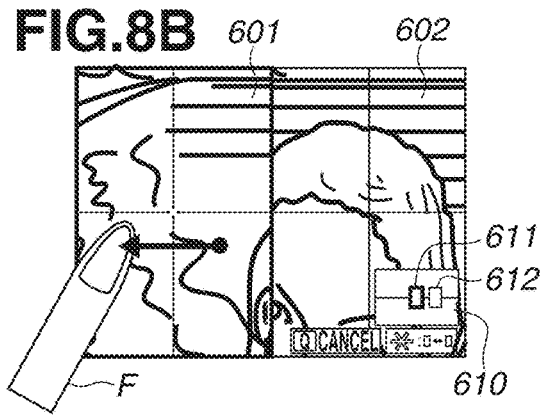
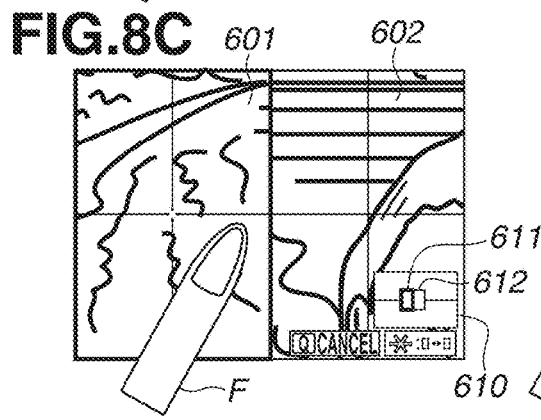
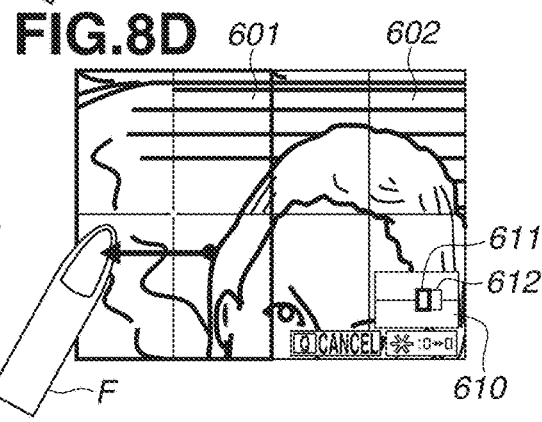
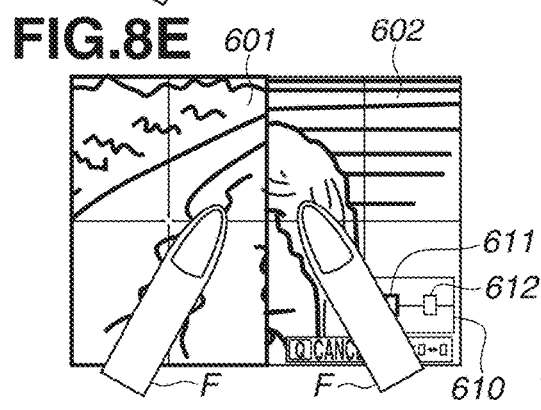
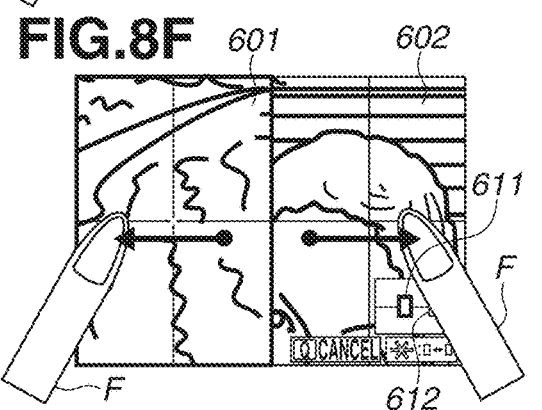
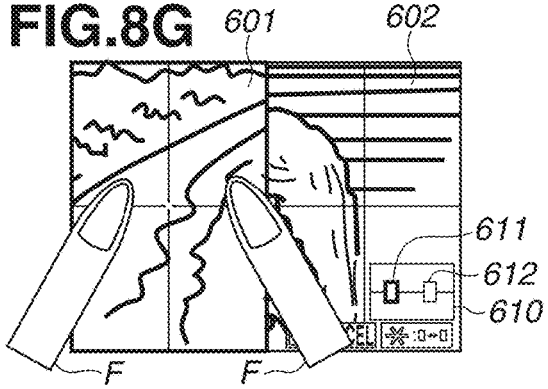
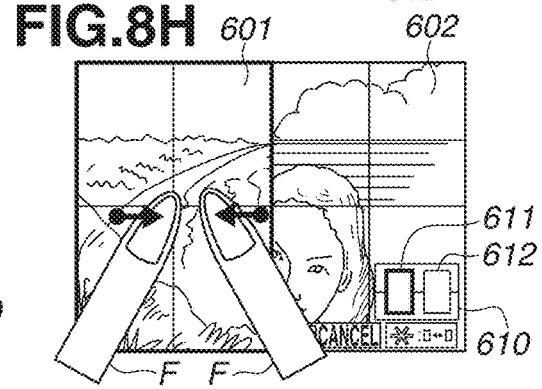

IMAGING CONTROL APPARATUS AND METHOD FOR CONTROLLING THE SAME

BACKGROUND OF THE INVENTION

Field of the Invention

The present disclosure relates to a technique for enlarging display of a part of a live view image.

Description of the Related Art

When using a camera, it is desirable to image a subject while horizontally holding the camera in some cases. For example, if the camera is not horizontally held when imaging a subject such as a building or scenery, a captured image is inclined and an awkward result may be obtained. To solve the issue, Japanese Patent Application Laid-Open No. 2012-060567 discusses a technique for detecting the orientation of a camera based on the direction of gravity detected by an acceleration sensor, and displaying the level display indicating the detected camera orientation together with a live view. Japanese Patent Application Laid-Open No. 2016-163104 discusses a technique for displaying, side by side, enlarged images of two different areas horizontally separated from each other on the live view image, making it possible to visually perform horizontal adjustment with good accuracy.

The technique discussed in Japanese Patent Application Laid-Open No. 2016-163104 implements such processing as selection of an active enlarged position (frame) out of the two enlarged positions, movement of display ranges, and change of the enlargement magnification by operating a plurality of operation members. Therefore, if a user does not know operation members for performing processing, the execution of processing may take time. If the user operates several operation members in a switching manner, the amount of user operations may increase. Further, the adjusted orientation of the camera may possibly be changed by an operation force on a hardware key.

SUMMARY OF THE INVENTION

The present disclosure is directed to providing an imaging control apparatus and an imaging control method for achieving processing in 2-area enlargement display with high operability through touch operations.

According to an aspect of the present disclosure, an imaging control apparatus includes a display control unit configured to perform 2-area enlargement display for displaying live view images respectively captured in a first and a second imaging area at horizontally different positions by an imaging unit, side by side on a display unit, a touch detection unit configured to detect a touch operation on the display unit, and a control unit configured to perform control, upon a move operation for movement in a horizontal direction while in contact with the display unit, in a case where the first and the second imaging areas respectively corresponding to ranges displayed in a first and a second display area in the 2-area enlargement display are separated from each other, to change a position of the first imaging area and not to change a position of the second imaging area in response to the move operation, and upon the move operation in the horizontal direction, in a case where the second imaging area adjoins the first imaging area in a direction in which the first imaging area is to be moved by the move operation, to change the positions of the first and the second imaging areas in response to the move operation.

Further features of the present disclosure will become apparent from the following description of exemplary embodiments with reference to the attached drawings.

BRIEF DESCRIPTION OF THE DRAWINGS

FIG. 4 is a flowchart illustrating 2-area enlargement processing.

FIGS. 6A to 6F illustrate display examples in the 2-area enlargement processing.

FIGS. 7A and 7B (collectively FIG. 7) are a flowchart illustrating touch operation processing in the 2-area enlargement processing.

FIGS. 8A to 8H illustrate examples of processing according to touch operations in the 2-area enlargement processing.

DESCRIPTION OF THE EMBODIMENTS

An exemplary embodiment of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Figure 1A:
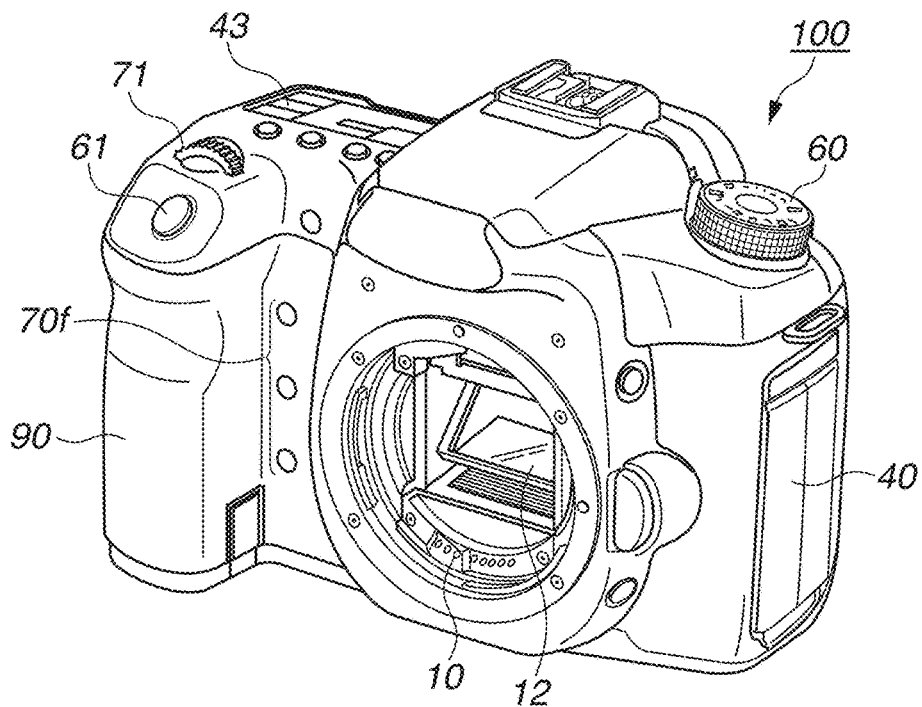
FIGS. 1A and 1B illustrate an outer appearance of a digital camera.
Figure 1B:
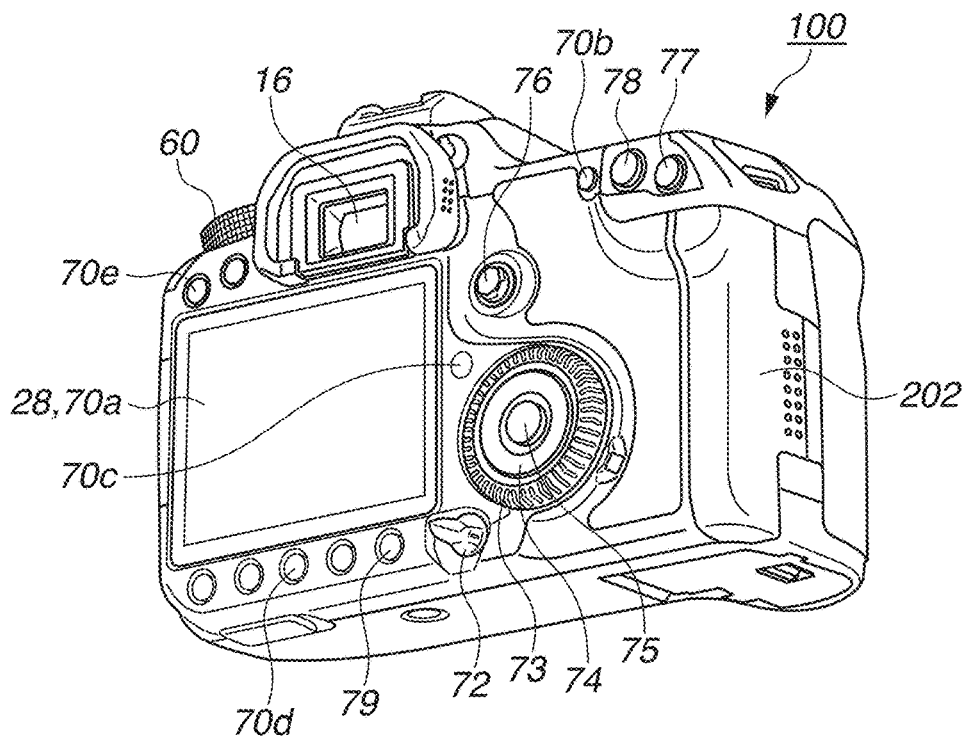

FIGS. 1A and 1B illustrate an outer appearance of a digital camera 100 as an example of an apparatus according to the present disclosure. FIG. 1A is a perspective view illustrating the front panel of the digital camera 100, and FIG. 1B is a perspective view illustrating the rear panel of the digital camera 100. Referring to FIGS. 1A and 1B, a display unit 28 disposed on the rear panel displays an image and various information. An out-finder display unit 43, a display unit disposed on the top face, displays the shutter speed, diaphragm, and other various setting values of the camera 100. A shutter button 61 is an operation portion for issuing an imaging instruction. A mode selection switch 60 is an operation portion for switching between various modes. A terminal cover 40 is a cover for protecting connectors (not illustrated) such as a connection cable for connecting an external apparatus and the digital camera 100. A main electronic dial 71 is a rotary operation member included in an operation unit 70. Turning the main electronic dial 71 enables changing setting values such as the shutter speed and diaphragm. A power switch 72 is an operation member for turning power of the digital camera 100 ON and OFF. A sub electronic dial 73, a rotary operation member included in the operation unit 70, enables moving a selection frame and feeding images. A cross key 74 included in the operation unit 70 is a cross key (four-way key) of which the upper, lower, right, and left portions can be pressed in. An operation corresponding to a pressed portion on the cross key 74 can be performed. A SET button 75 included in the operation unit 70 is mainly used to determine a selection item. A live view (LV) button 76 included in the operation unit 70 turns the live view (LV) ON and OFF in the still image imaging mode. In the moving image capturing mode, the LV button 76 is used to instruct the camera 100 to start and stop moving image capturing (recording). An enlargement button 77, an operation button included in the operation unit 70, turns the enlargement mode ON and OFF in live view display in the imaging mode and changes the magnification in the enlargement mode. In the playback image, the enlargement button 77 enlarges the playback image and increases the magnification. A reduction button 78 included in the operation unit 70 reduces the magnification of the enlarged playback image to reduce the displayed image. A playback button 79 included in the operation unit 70 switches between the imaging mode and the playback mode. When a user presses the playback button 79 in the imaging mode, the camera 100 enters the playback mode, and the latest image of images recorded in a recording medium 200 is displayed on the display unit 28. A quick return mirror 12 is moved up and down by an actuator (not illustrated) under the direction of a system control unit 50. A communication terminal 10 is used by the digital camera 100 to communicate with the detachably attached lens. An eyepiece finder 16 is a look-in type finder for confirming the focus and composition of an optical image of a subject obtained through a lens unit 150 by observing a focusing screen 13. A cover 202 is a cover of a slot storing the recording medium 200. A grip portion 90 is a holding portion having a shape which is easy to grasp with the right hand, when the user holds the digital camera 100.

Figure 2:
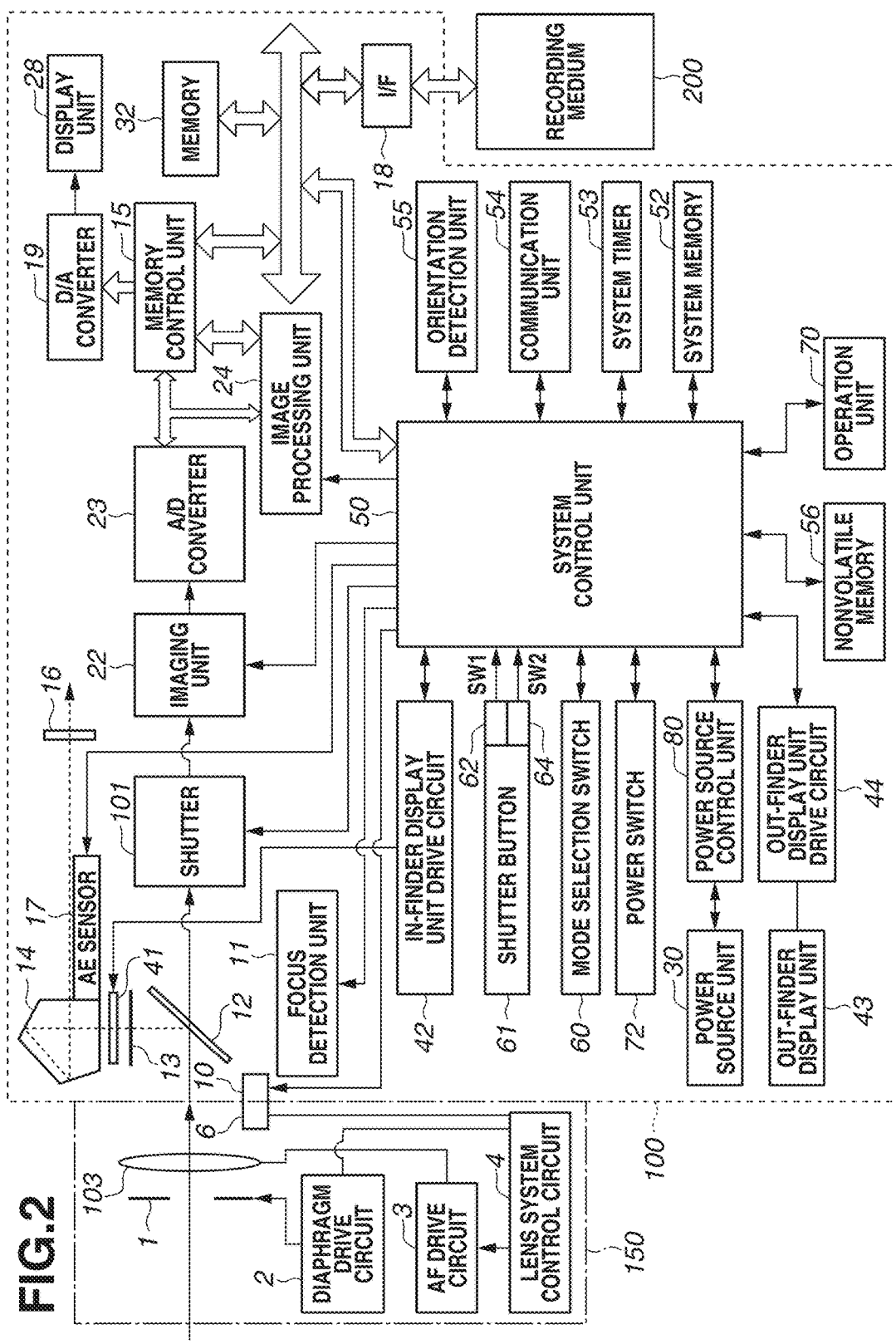
FIG. 2 is a block diagram illustrating a configuration of the digital camera.

FIG. 2 is a block diagram illustrating an example of a configuration of the digital camera 100 according to the present exemplary embodiment.

Referring to FIG. 2, the lens unit 150 mounts an exchangeable imaging lens.

Although the lens 103 includes a plurality of lenses, FIG. 2 illustrates only one lens for simplification. A communication terminal 6 is used by the lens unit 150 to communicate with the digital camera 100. The communication terminal 10 is used by the digital camera 100 to communicate with the lens unit 150. The lens unit 150 communicates with the system control unit 50 via the communication terminals 6 and 10. In the lens unit 150, a lens system control circuit 4 controls a diaphragm 1 via a diaphragm drive circuit 2 and changes the position of the lens 103 via an AF drive circuit 3 to focus on the subject.

An auto exposure (AE) sensor 17 measures the luminance of the subject through the lens unit 150.

A focus detection unit 11 outputs defocus amount information to the system control unit 50. The system control unit 50 controls the lens unit 150 based on the information to perform phase difference autofocus (AF).

When performing exposure, live view imaging, and moving image capturing, the quick return mirror 12 (hereinafter referred to as a mirror 12) is moved up and down by the actuator (not illustrated) under the direction of the system control unit 50. The mirror 12 switches the destination of the incident light flux from the lens 103 between the finder 16 and an imaging unit 22. In the normal state, the mirror 12 is usually disposed to reflect the light flux to guide it to the finder 16. In the imaging and live view display states, the mirror 12 pops up to guide the light flux to the imaging unit 22 and retreats from the light flux (mirror up). The center portion of the mirror 12 is configured as a half mirror to transmit a part of light so that a part of the light flux is incident to the focus detection unit 11 for performing focus detection.

A photographer can confirm the focus and composition of an optical image of a subject obtained through the lens unit 150 by observing the focusing screen 13 via a pentaprism 14 and the finder 16.

A shutter 101 is a focal plane shutter capable of freely controlling the exposure time of the imaging unit 22 under the control of the system control unit 50.

The imaging unit 22 is an image sensor including a charge coupled device (CCD) sensor or a complementary metal oxide semiconductor (CMOS) sensor for converting an optical image into an electric signal. An analog-to-digital (A/D) converter 23 converts an analog signal into a digital signal. The A/D converter 23 is used to convert the analog signal output from the imaging unit 22 into a digital signal.

An image processing unit 24 performs predetermined pixel interpolation, resizing processing such as reduction, and color conversion processing on data from the A/D converter 23 or data from a memory control unit 15. The image processing unit 24 performs predetermined calculation processing by using captured image data. The system control unit 50 performs exposure control and ranging control based on an obtained calculation result. This enables performing the AF processing, AE processing, and pre-flash (EF) processing based on the Through the Lens (TTL) method. The image processing unit 24 further performs predetermined calculation processing by using captured image data, and performs TTL-based automatic white balance (AWB) processing based on the obtained calculation result.

The output data from the A/D converter 23 is written in the memory 32 via the image processing unit 24 and the memory control unit 15, or directly written in the memory 32 via the memory control unit 15. The memory 32 stores image data captured by the imaging unit 22 and converted into digital data by the A/D converter 23, and stores image data to be displayed on the display unit 28. The memory 32 is provided with a sufficient storage capacity for storing a predetermined number of still images and moving images and sound for a predetermined time.

The memory 32 also serves as an image display memory (video memory). A digital-to-analog (D/A) converter 19 converts image display data stored in the memory 32 into an analog signal and supplies the analog signal to the display unit 28. In this way, the image display data written in the memory 32 is displayed on the display unit 28 via the D/A converter 19. The display unit 28 displays an image corresponding to the analog signal from the D/A converter 19 on a display such as a liquid crystal display (LCD). The digital signal generated through A/D conversion by the A/D converter 23 and stored in the memory 32 is converted into an analog signal by the D/A converter 19 and successively transmitted to the display unit 28. The display unit 28 displays an image based on the analog signal, functioning as an electronic view finder capable of live view display.

A frame (AF frame) indicating the focusing point at which autofocus is currently being performed and icons indicating the setting conditions of the camera 100 are displayed on an in-finder LCD unit 41 via an in-finder display unit drive circuit 42.

The shutter speed, diaphragm, and other various setting values of the cameras 100 are displayed on the out-finder display unit 43 via an out-finder display unit drive circuit 44.

A nonvolatile memory 56 is an electrically erasable recordable memory such as an electrically erasable programmable read only memory (EEPROM). Constants and programs for operations of the system control unit 50 are stored in the nonvolatile memory 56. Programs stored in the nonvolatile memory 56 refer to programs for executing various flowcharts (described below) according to the present exemplary embodiment.

The system control unit 50 having at least one processor controls the entire digital camera 100. Each piece of processing according to the present exemplary embodiment (described below) is implemented when the system control unit 50 executes the above-described programs recorded in the nonvolatile memory 56. A system memory 52 is a random access memory (RAM). The constants and variables for operations of the system control unit 50 and the programs read from the nonvolatile memory 56 are loaded into the system memory 52. The system control unit 50 also controls the memory 32, the D/A converter 19, and the display unit 28 to perform display control.

A system timer 53 is a time measurement unit for measuring time used for various control and time of a built-in clock.

The mode selection switch 60, a first shutter switch 62, a second shutter switch 64, and the operation unit 70 are operation portions for inputting various operation instructions to the system control unit 50.

The mode selection switch 60 switches the operation mode of the system control unit 50 between the still image recording mode, the moving image capturing mode, and the playback mode. Modes included in the still image recording mode include the auto imaging mode, auto scene determination mode, manual mode, diaphragm priority mode (Av mode), and shutter speed priority mode (Tv mode). The digital camera 100 is provided with various scene modes as imaging settings for each imaging scene, the programmed AE mode, and the custom mode. The mode selection switch 60 allows the user to directly select one of these modes. Alternatively, after selecting the imaging mode list screen by using the mode selection switch 60, the user may select either one of a plurality of displayed modes by using other operation member. Likewise, a plurality of modes may also be included in the moving image capturing mode.

The first shutter switch 62 turns ON in the middle of an operation (half-depression) of the imaging operation member provided on the digital camera 100, i.e., the shutter button 61, to generate a first shutter switch signal SW1. The half-depression refers to a first operation, i.e., an imaging preparation instruction. The first shutter switch signal SW1 causes the system control unit 50 to start operations for imaging preparation processing including the AF processing, AE processing, AWB processing, and EF processing.

A second shutter switch 64 turns ON upon completion of an operation (full-depression) of the shutter button 61 to generate a second shutter switch signal SW2. The full-depression refers to a second operation, i.e., an imaging instruction operation. The second shutter switch signal SW2 causes the system control unit 50 to start a series of operations in the imaging processing from signal reading from the imaging unit 22 to image data writing in the recording medium 200.

When the user performs an operation for selecting any one of various function icons displayed on the display unit 28, each operation member of the operation unit 70 is suitably assigned a function for each scene and serves as a function button. Examples of function buttons include the end button, return button, image advancing button, jump button, narrowing-down button, and attribute change button. For example, when a menu button 70e is pressed, the menu screen allowing various settings is displayed on the display unit 28. The user can intuitively perform various settings by using the menu screen displayed on the display unit 28, the cross key 74 (four-way operation key), and the SET button 75.

The operation unit 70 includes various operation members as an input unit for receiving operations from the user. The operation unit 70 includes at least the following operation members: the shutter button 61, the main electronic dial 71, the power switch 72, the sub electronic dial 73, the cross key 74, the SET button 75, the LV button 76, the enlargement button 77, the reduction button 78, and the playback button 79. The cross key 74 is a four-way button of which the upper, lower, right, and left portions can be pressed in. Although, in the present exemplary embodiment, the cross key 74 is described as an integrally formed operation portion, the cross key 74 may be provided as four independent buttons (upper, lower, right, and left buttons). Hereinafter, the top and button keys are collectively referred to as a top/bottom key, and the right and left keys are collectively referred to as a right/left key. The operation unit 70 also includes the following operation portions.

An AF-ON button 70b is a push-in button switch included in the operation unit 70. Pressing this button issues an instruction for executing AF. The depressing direction of the AF-ON button 70b is parallel to the direction (optical axis) of subject light incident to the imaging unit 22 from the lens 103.

A quick setting key 70c (hereinafter referred to as a Q button 70c) is a push-in button switch included in the operation unit 70. Pressing this key displays a quick setting menu as a list of setting items settable in each operation mode. For example, the Q button 70c is pressed during the imaging standby state in live view imaging, a list of setting items including the electronic leading blade shutter, monitor brightness, LV screen WB, 2-area enlargement, and silent imaging is superimposed on the LV in one row. When the user selects a desired option in the displayed quick setting menu by using the top/bottom key and then press a SET button, the user can shift to the setting change and operation mode related to the selected setting item.

An active frame change button 70d is a push-in button switch included in the operation unit 70. Pressing this button in the 2-area enlargement processing (described below) selects the active enlarged position (frame) out of the two enlarged positions. This button is assigned different functions depending on the operation modes. Pressing this button in the playback mode gives a protection attribute to the displayed image.

The menu button 70e is a push-in button switch included in the operation unit 70. Pressing this button displays on the display unit 28 the menu screen in which various settings are possible.

Function buttons 70f are three push-button switches included in the operation unit 70. The function buttons 70f are assigned different functions. The function buttons 70f are disposed at positions which can be operated with the middle finger, third finger, and little finger of the right hand holding the grip portion 90. The depressing direction is parallel to the direction (optical axis) of the subject light incident to the imaging unit 22 from the lens 103.

A power source control unit 80 includes a battery detection circuit, a direct-current to direct-current (DC-DC) converter, and a switch circuit for selecting a block to be supplied with power. The power source control unit detects the presence or absence of a battery, the battery type, and the remaining battery capacity. The power source control unit 80 also controls the DC-DC converter based on the result of the detection and an instruction of the system control unit 50 to supply required voltages to the recording medium 200 and other components for required time periods.

A power source unit 30 includes a primary battery (such as an alkaline battery and a lithium battery), a secondary battery (such as a NiCd battery, NiMH battery, and Li battery), and an alternating current (AC) adaptor. A recording medium interface (I/F) 18 is an interface to the recording medium 200 such as a memory card and hard disk. The recording medium 200 is such a recording medium as a memory card for recording captured images, including a semiconductor memory and magnetic disk.

A communication unit 54 wirelessly or wired establishes connection to perform transmission and reception of an image signal and an audio signal. The communication unit 54 can also connect with a wireless Local Area Network (LAN) and the Internet. The communication unit 54 can transmit images (including a live view image) captured by the imaging unit 22 and images recorded in the recording medium 200, and receive image data and other various information from an external apparatus.

An orientation detection unit 55 detects the orientation of the digital camera 100 in the gravity direction. Based on the orientation detected by the orientation detection unit 55, the system control unit 50 can determine whether the image captured by the imaging unit 22 is an image captured with the digital camera 100 horizontally held or an image captured with the digital camera 100 vertically held. The system control unit 50 can add direction information corresponding to the orientation detected by the orientation detection unit 55 to the image file of the image captured by the imaging unit 22 or rotate the image before recording. An acceleration sensor or a gyroscope sensor can be used as the orientation detection unit 55.

As one component of the operation unit 70, the digital camera 100 is provided with the touch panel 70a that is capable of detecting a contact on the display unit 28. The touch panel 70a and the display unit 28 can be integrally formed. For example, the touch panel 70a is configured so that the transmittance of light does not disturb the display of the display unit 28, and is attached to the upper layer of the display surface of the display unit 28. Then, the input coordinates on the touch panel 79a are associated with the display coordinates on the display unit 28. This enables configuring such a graphical user interface (GUI) that allows the user to have a feeling of directly operating the screen displayed on the display unit 28. The system control unit 50 can detect the following operations on the touch panel 70a and states thereof.

An operation to start touching the touch panel 70a with the finger or pen that has not been in contact with the touch panel 70a (hereinafter referred to as a "touch-down")

A state where the finger or pen is in contact with the touch panel 70a (hereinafter referred to as a "touch-on")

An operation to move the finger or pen while in contact with the touch panel 70a (hereinafter referred to as a "touch-move")

An operation to detach the finger or pen from the touch panel 70a to end touching (hereinafter referred to as a "touch-up")

A state where the finger or pen is not in contact with the touch panel 70a (hereinafter referred to as a "touch-off")

When a touch-down is detected, a touch-on is detected at the same time. After a touch-down is detected, a touch-on is normally kept being detected until a touch-up is detected. A touch-move is also detected in a state where a touch-on is detected. Even when a touch-on is detected, a touch-move is not detected if the touch position is not moving. After a touch-up is detected for all of fingers or pen that have been in contact with the touch panel 70a, a touch-off is detected.

Figure 3:
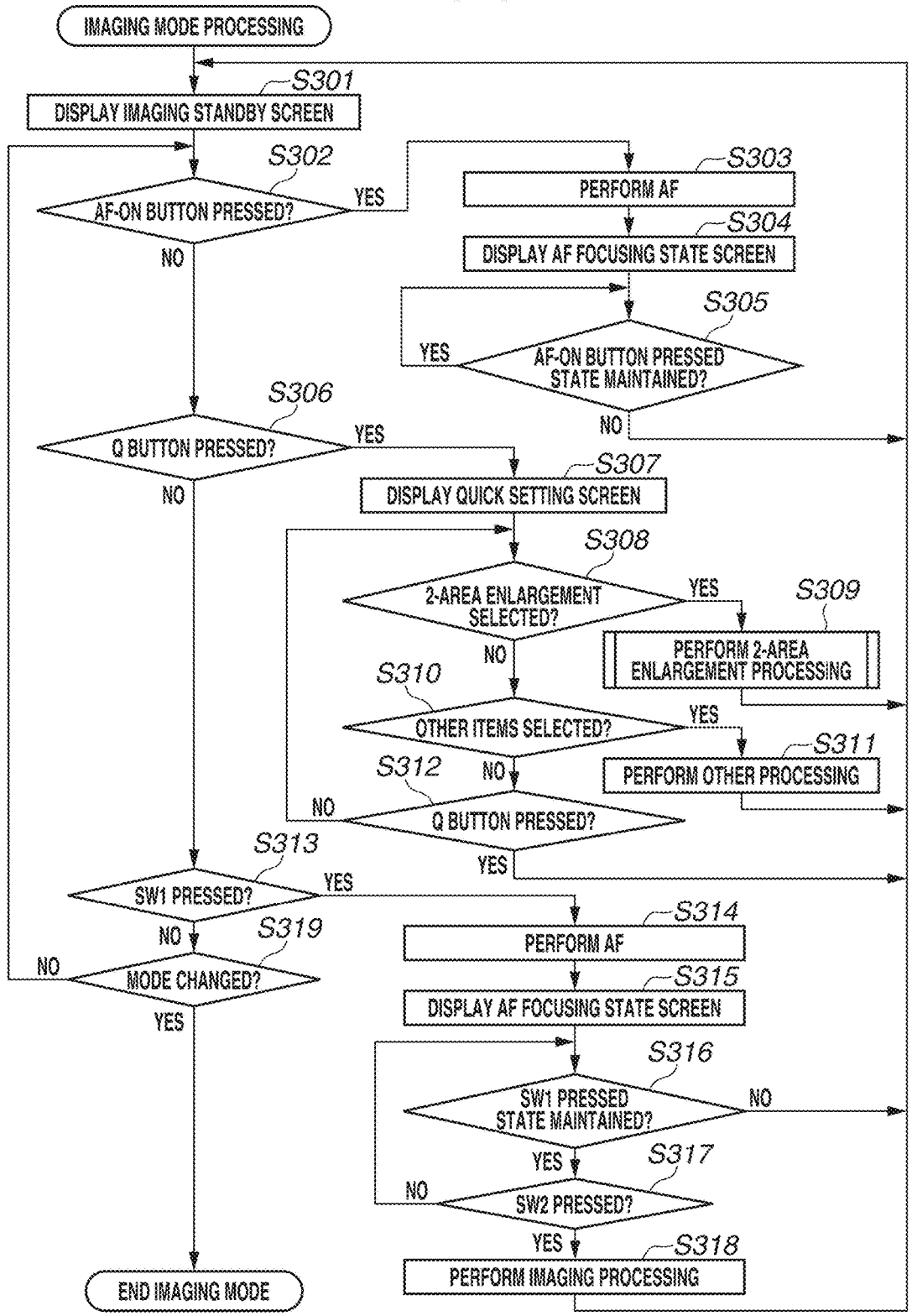
FIG. 3 is a flowchart illustrating imaging mode processing.

The above-described operations and states as well as the position coordinates of the position where the finger or pen contacts the touch panel 70a are notified to the system control unit 50 via an internal bus. Based on the notified information, the system control unit 50 determines what kind of a touch operation has been performed on the touch panel 70a. As for a touch-move, the moving direction of the finger or pen moving on the touch panel 70a can be determined for each of the vertical and horizontal components on the touch panel 70a based on changes of the position coordinates. When a touch-move over a predetermined distance or longer is detected, the system control unit 50 determines that a slide operation has been performed. An operation to quickly move the finger over a certain distance while in contact with the touch panel 70a and then release the finger is referred to as a flick. In other words, a flick is an operation by the finger quickly touching and moving, like a quick swiping motion, on the surface of the touch panel 70a. When a touch-move at a predetermined speed or higher over a predetermined distance or longer is detected and then a touch-up is subsequently detected, it can be determined that a flick has been performed (a flick has been performed following a slide operation). A touch operation to simultaneously touch a plurality of positions (for example, two positions) and bring these positions close to each other is referred to as a "pinch-in". A touch operation to move these positions away from each other is referred to as a "pinch-out". A pinch-out and a pinch-in are collectively referred to as a pinch operation (or simply referred to as a "pinch"). The touch panel 70a may be of any one of various types including resistance film type, capacitance type, surface acoustic wave type, infrared-ray type, electromagnetic induction type, image recognition type, and optical sensor type. Although a touch is detected when the finger or pen comes in contact with the touch panel 70a or when the finger or pen comes close to the touch panel 70a depending on the type, either type is applicable. FIG. 3 is a flowchart illustrating processing during the imaging standby state of the digital camera 100. This processing is implemented when the system control unit 50 loads a program recorded in the nonvolatile memory 56 into the system memory 52 and then executes the program. When the digital camera 100 is activated in the imaging mode and then the live view imaging is turned ON, the digital camera 100 starts the processing illustrated in FIG. 3.

Figure 5A:
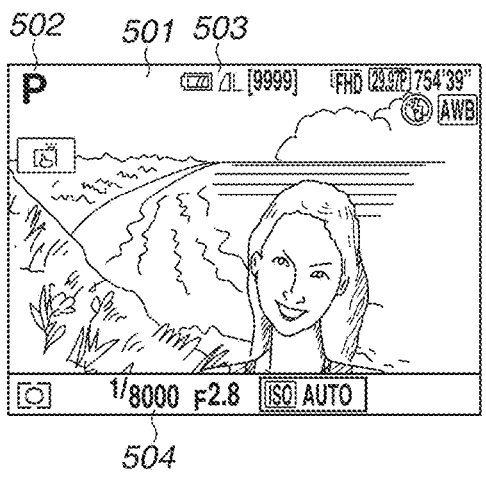
FIGS. 5A to 5E illustrate display examples in the imaging mode processing.

In step S301, the system control unit 50 displays an imaging standby screen on the display unit 28. FIG. 5A illustrates an example of the imaging standby screen. The imaging standby screen displays a live view image 501 (LV image 501) indicating the entire imaging range. An icon 502 indicating the current imaging mode and information display 503 related to imaging settings are superimposed on the LV image 501.

Figure 5D:
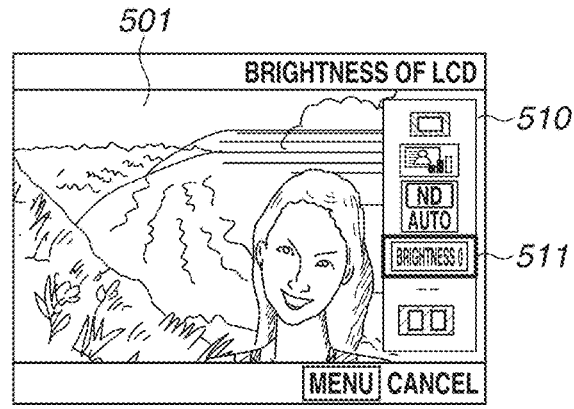
Figure 5B:
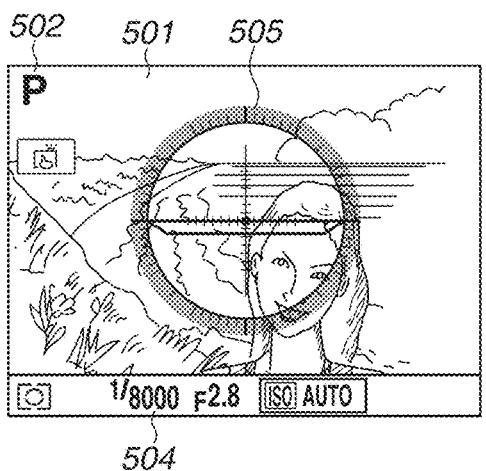

FIG. 5B illustrates another example of the imaging standby screen displaying other information. It becomes possible to simply adjust the level of the camera 100 by superimposing a level 505 on the live view image 501. The level 505 is an electronic level indicating the orientation of the digital camera 100 with respect to the gravity direction detected by the orientation detection unit 55. The level 505 indicates the inclination of the digital camera 100 in the lateral direction (lateral direction of the imaging unit 22) with respect to the direction (horizontal direction) perpendicular to the gravity direction. A level image can be obtained by adjusting the orientation of the digital camera 100 so that the inclination becomes zero while monitoring the level 505. The level 505 further indicates the inclination of the optical axis of the digital camera 100 (direction of the subject light incident to the imaging unit 22) with respect to the direction (horizontal direction) perpendicular to the gravity direction, i.e., the elevation angle or depression angle. The display state illustrated in FIG. 5A and the display state illustrated in FIG. 5B can be switched by depression of the information selection button (INFO button) included in the operation unit 70. It is also possible to, by depression of the information selection button, select a display state where the live view image 501 is displayed, and the icon 502, the information display 503 related to the imaging setting, and information 504 related to exposure are not displayed.

Figure 5E:
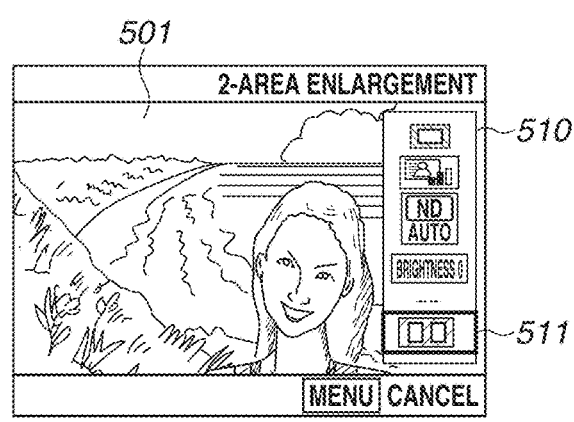
Figure 5C:
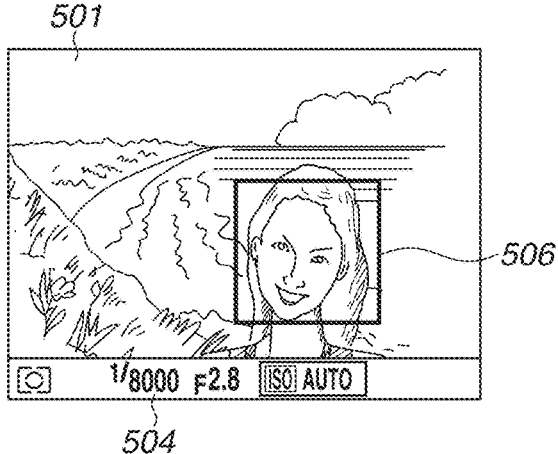

In step S302, the system control unit 50 determines whether the AF-ON button 70b is pressed. When the AF-ON button 70b is pressed (YES in step S302), the processing proceeds to step S303. On the other hand, when the AF-ON button 70b is not pressed (NO in step S302), the processing proceeds to step S306. In step S303, the system control unit 50 performs AF. In step S304, the system control unit 50 displays the screen in the AF focusing state. An example screen in the AF focusing state is illustrated in FIG. 5C. At the in-focus subject portion, a frame 506 indicating the focusing state is superimposed on the live view image 501. If the focusing state cannot be obtained as a result of AF, the system control unit 50 displays a focusing failure indication.

In step S305, the system control unit 50 determines whether the pressed state of the AF-ON button 70b is maintained. When the pressed state of the AF-ON button 70b is maintained (YES in step S305), the system control unit 50 continues displaying the AF focusing state screen. On the other hand, when the AF-ON button 70b is released (NO in step S305), the system control unit 50 cancels the AF focusing state screen, and displays the imaging standby screen again.

In step S306, the system control unit 50 determines whether the Q button 70c is pressed. When the Q button 70c is pressed (YES in step S306), the processing proceeds to step S307. On the other hand, when the Q button 70c is not pressed (NO in step S306), the processing proceeds to step S313. In step S307, the system control unit 50 displays a quick setting menu on the display unit 28. FIG. 5D illustrates an example screen of the quick setting menu. A quick setting menu 510 is superimposed on the live view image 501. The quick setting menu 510 displays an icon group indicating different items. A cursor 511 is displayed on a selected icon. The cursor 511 can be moved by a vertical movement operation with the cross key 74.

In step S308, the system control unit 50 determines whether the SET button 75 is pressed in a state (illustrated in FIG. 5E) where the cursor 511 is positioned at an icon indicating a 2-area enlargement item out of a plurality of items displayed in the quick setting menu 510. More specifically, the system control unit 50 determines whether a 2-area enlargement item is selected. When the system control unit 50 determines that a 2-area enlargement item is selected (YES in step S308), the processing proceeds to step S309. On the other hand, when the system control unit 50 determines that a 2-area enlargement item is not selected (NO in step S308), the processing proceeds to step S310. In step S309, the system control unit 50 performs the 2-area enlargement processing. The 2-area enlargement processing will be described below with reference to FIG. 4.

In step S310, the system control unit 50 determines whether an item other than the 2-area enlargement processing is selected. When the system control unit 50 determines that an item other than the 2-area enlargement processing is selected (YES in step S310), the processing proceeds to step S311. On the other hand, when the system control unit 50 determines that an item other than the 2-area enlargement processing is not selected (NO in step S310), the processing proceeds to step S312. In step S311, the system control unit 50 performs processing according to a selected item other than the 2-area enlargement processing. For example, when an item of brightness adjustment for the LCD (display unit 28) is selected, the system control unit 50 displays a screen of brightness adjustment for the LCD is displayed on the display unit 28, and adjusts the brightness of the display unit 28 in response to a user operation.

In step S312, the system control unit 50 determines whether the Q button 70c is pressed. When the Q button 70c is pressed (YES in step S312), the system control unit 50 ends the display of the quick setting menu. On the other hand, when the Q button 70c is not pressed (NO in step S312), the processing returns to step S308. Then, the system control unit 50 repeats the subsequent processing.

In step S313, the system control unit 50 determines whether the shutter button 61 is half-pressed and SW1 is set to ON. When SW1 is set to ON (YES in step S313), the processing proceeds to step S314. On the other hand, when SW1 is not set to ON (NO in step S313), the processing proceeds to step S319. In step S314, the system control unit 50 performs AF. In addition to AF, the system control unit 50 also performs other imaging preparation processing such as automatic exposure (AE) according to the setting. In step S315, when the focusing state is obtained as a result of AF, the system control unit 50 displays the screen of the AF focusing state. In step S316, the system control unit 50 determines whether the pressed state of the first shutter switch (ON state of SW1) is maintained. When the ON state of SW1 is maintained (YES in step S316), the processing proceeds to step S317. On the other hand, when the ON state of SW1 is not maintained, i.e., the half-press state of the shutter button 61 is canceled (NO in step S316), the system control unit 50 cancels the AF focusing state. Then, the processing returns to step S301. In step S317, the system control unit 50 determines whether the shutter button 61 is fully pressed and SW2 is set to ON. When SW2 is set to ON (YES in step S317), the processing proceeds to step S318. On the other hand, when SW2 is not set to ON (NO in step S317), the processing returns to step S316. In step S318, according to the ON state of SW2, the system control unit 50 performs the above-described imaging processing (a series of operations in the imaging processing from signal reading from the imaging unit 22 to image file writing in the recording medium 200). When the quick review is set to ON, the system control unit 50 automatically displays an image that has just been captured after the imaging processing on the display unit 28 for a predetermined period, allowing the user to confirm the imaging. Upon completion of the imaging processing, the processing returns to step S301.

In step S319, the system control unit 50 determines whether a mode change event has occurred. When a mode change event has occurred (YES in step S319), the system control unit 50 ends the imaging mode processing. On the other hand, when a mode change event has not occurred (NO in step S319), the processing returns to step S302. Then, the system control unit 50 repeats the subsequent processing. Mode change events include power OFF, an end of the live view mode (selection of the optical finder imaging mode), and selection of the playback mode.

FIG. 4 is a flowchart illustrating details of the above-described 2-area enlargement processing in step S309. This processing is implemented when the system control unit 50 loads a program recorded in the nonvolatile memory 56 into the system memory 52 and then executes the program.

In step S401, the system control unit 50 performs 2-area enlargement display on the display unit 28. An example of a 2-area enlargement display screen is illustrated in FIG. 6A. In the 2-area enlargement display, the system control unit 50 displays side by side the live view images of two areas separated from each other in the lateral direction (horizontal direction) or in the up and down direction (vertical direction). FIG. 6A illustrates an example of the live view images of two areas separated from each other in the horizontal direction displayed side by side on one screen. A left side area 601 is a display area for displaying the live view image currently being captured in a part of the left side area of the imaging unit 22. A right side area 602 is a display area for displaying the live view image currently being captured in a part of the right side area of the imaging unit 22. The live view images displayed in the left side area 601 and the right side area 602 have the same height in the imaging unit 22. An active frame 603 is a selection frame indicating the current operation target area (active area) out of the left side area 601 and the right side area 602. Referring to FIG. 6A, the active frame 603 is displayed on the left side area 601, indicating that the left side area 601 is the current target of right and left movements and AF. Auxiliary lines 604 are displayed at the horizontal and vertical centers of the left side area 601. The intersection of the auxiliary lines 604 is the center of the left side area 601. Likewise, auxiliary lines are displayed at the horizontal and vertical centers of the right side area 602. A center marker 605, a marker displayed on the active frame side, indicates the center of the left side area 601 as an active frame. The auxiliary lines 604 and the center marker 605 are not displayed at the center of the active frame to allow the user to confirm the subject positioned at the center. A guide 606 is a guidance display indicating an operation member (operation method) for canceling the 2-area enlargement display. A guide 607 is a guidance display indicating an operation member (operation method) for switching the active frame. An enlarged position guide 610 indicates the portions currently enlarged as the left side area 601 and the right side area 602 in the entire imaging range (the entire live view image captured by the imaging unit 22 or the entire imaging range reflected in a still image captured according to an imaging instruction). In other words, the enlarged position guide 610 indicates the positions and sizes of the two imaging areas respectively corresponding to the left side area 601 and the right side area 602 relative to the entire imaging range. A left side indicator 611 indicates the range of the live view image displayed in the left side area 601 relative to the entire imaging range. The right side indicator 612 indicates the range of the live view image displayed in the right side area 602 relative to the entire imaging range. To indicate that the active frame 603 is displayed in the left side area 601, the left side indicator 611 is displayed with a different color or thickness from the right side indicator 612. The guides 606 and 607 and the enlarged position guide 610 are superimposed on the live view image of the area without the active frame 603 (non-active frame) so that these guides do not disturb the visual recognition of the live view image of the area with the active frame 603.

In step S402, the system control unit 50 determines whether either the enlargement button 77 or the reduction button 78 is pressed (enlargement/reduction instruction). When either the enlargement button 77 or the reduction button 78 is pressed (YES in step S402), the processing proceeds to step S403. On the other hand, when neither the enlargement button 77 nor the reduction button 78 is pressed (NO in step S402), the processing proceeds to step S404.

In step S403, the system control unit 50 changes the magnifications of the LV images displayed with 2-area enlargement by an operation. When the enlargement button 77 is pressed, the system control unit 50 increases the respective magnifications of the LV images displayed in the left side area 601 and the right side area 602 and makes the magnifications identical (enlarges the LV images displayed in the left side area 601 and the right side area 602 in an associative way). When the reduction button 78 is pressed, the system control unit 50 decreases the respective magnifications of the LV images displayed in the left side area 601 and the right side area 602 and makes the magnifications identical. The system control unit 50 records the changed magnifications in the system memory 52. Even after the 2-area enlargement display is once canceled, when the 2-area enlargement display is performed again without turning power OFF, the system control unit 50 displays the two LV images with the same magnifications. FIG. 6B illustrates an example screen when the LV images are enlarged by pressing the enlargement button 77 in the state illustrated in FIG. 6A. The live view images displayed in the left side area 601 and the right side area 602 illustrated in FIG. 6B are larger than the respective live view images illustrated in FIG. 6A. The display ranges relative to the entire imaging range decreases according to the degree of enlargement. Therefore, the left side indicator 611 and the right side indicator 612 displayed in the enlarged position guide 610 illustrated in FIG. 6B are smaller than respective indicators illustrated in FIG. 6A.

In step S404, the system control unit 50 determines whether the active frame change button 70d is pressed. When the active frame change button 70d is pressed (YES in step S404), the processing proceeds to step S405. On the other hand, when the active frame change button 70d is not pressed (NO in step S404), the processing proceeds to step S406.

In step S406, the system control unit 50 moves the active frame 603 from the area where the active frame 603 has been positioned before the operation to the other area. FIG. 6C illustrates an example screen when the active frame change button 70d is pressed in the state illustrated in FIG. 6B and the active frame 603 is moved. The active frame 603 positioned on the left side area 601 as illustrated in FIG. 6B has moved to the right side area 602 as illustrated in FIG. 6C. In addition, the guides 606 and 607 and the enlarged position guide 610 have been moved to a position in the left side area 601 as the non-active frame in a superimposed manner.

In step S406, the system control unit 50 determines whether the right/left key of the cross key 74 is operated. When the right/left key is operated (YES in step S406), the processing proceeds to step S407. On the other hand, when the horizontal key is not operated (NO in step S406), the processing proceeds to step S408.

In step S407, in response to operation of the right/left key, the system control unit 50 horizontally moves the display range of the area displayed with the active frame 603. More specifically, when the left key is pressed, the system control unit 50 moves the display range of the area displayed with the active frame 603 towards the left. When the right key is pressed, the system control unit 50 moves the display range of the area displayed with the active frame 603 towards the right. FIG. 6D illustrates an example screen when the right key is pressed several times in the state illustrated in FIG. 6C. Referring to FIG. 6D, the enlargement area displayed with the active frame 603 in the right side area 602 is moved further to the right in the imaging range than in the state illustrated in FIG. 6C (i.e., the image itself scrolls to the left). At this timing, the display range of the left side area 601 as the non-active frame remains unchanged (when the left side area 601 and the right side area 602 do not adjoin each other, the respective horizontal movements are performed not in an associative way). Referring to the enlarged position guide 610 illustrated in FIG. 6D, the right side indicator 612 is moved further to the right than in the state illustrated in FIG. 6C to indicate that the display range of the right side area 602 has further moved towards the right. The system control unit 50 records the changed display range (display position) in the system memory 52. Even after the 2-area enlargement display is once canceled, when the 2-area enlargement display is performed again without turning power OFF, the system control unit 50 performs the 2-area enlargement display on the same display ranges. In a case where the right end of the display range of the left side area 601 adjoins the left end of the display range of the right side area 602, even if the active frame 603 is on the left side area 601, the system control unit 50 moves both of the display ranges of the left side area 601 and the right side area 602 to the right in an associative way in response to an instruction for further movement to the right. However, when the right side area 602 has reached the right end of the entire imaging range, the display ranges cannot be moved any further to the right, so that the system control unit 50 does not move the display ranges even if an instruction for further movement to the right is issued. On the contrary, in a case where the left end of the display range of the right side area 602 adjoins the right end of the display range of the left side area 601, even if the active frame 603 is on the right side area 602, the system control unit 50 moves both of the display ranges of the left side area 601 and the right side area 602 to the left in response to an instruction for further movement to the left. However, when the left side area 601 has reached the left end of the entire imaging range, the display ranges cannot be moved any further to the left, so that the system control unit 50 does not move the display ranges even if an instruction for further movement to the left is issued.

In step S408, the system control unit 50 determines whether the top/bottom key of the cross key 74 is operated. When the top/bottom key is operated (YES in step S408), the processing proceeds to step S409. On the other hand, when the vertical keys is not operated (NO in step S408), the processing proceeds to step S410.

In step S409, in response to the operation of the top/bottom key, the system control unit 50 vertically moves the display ranges of the left side area 601 and the right side area 602 in an associative way. More specifically, when the upper key is pressed, the system control unit 50 moves up the display ranges of the left side area 601 and the right side area 602 in an associative way. When the lower key is pressed, the system control unit 50 moves down the display ranges of the left side area 601 and the right side area 602 in an associative way. FIG. 6E illustrates an example screen when the upper key is pressed several times in the state illustrated in FIG. 6D. Referring to FIG. 6E, the display ranges of the left side area 601 and the right side area 602 are moved further upward in the imaging range than in the state illustrated FIG. 6D (i.e., the image itself scrolls down). Referring to the enlarged position guide 610 illustrated in FIG. 6E, the left side indicator 611 and the right side indicator 612 are moved further upward than in the state illustrated in FIG. 6D to indicate that the display ranges of the left side area 601 and the right side area 602 have moved further upward. The system control unit 50 records the changed display range (display position) in the system memory 52. Even after the 2-area enlargement display is once canceled, when the 2-area enlargement display is performed again without turning power OFF, the system control unit 50 performs the 2-area enlargement display on the same display ranges.

After repeating the above-described operations to set display ranges for the 2-area enlargement display at two separate positions based on the horizon, a horizontal outline of a building, etc., the user can capture a subject image with the line of the subject horizontally reflected by imaging the subject after adjusting the orientation of the camera 100 to align the lines of the subject in the left side area 601 and the right side area 602. FIG. 6F illustrates an example screen at the time of the 2-area enlargement display, in which the left side area 601 is set to a subject portion including a horizontal line 621 and the right side area 602 is set to a subject portion including a horizontal line 622 at a position separate from that of the horizon 621. Although the horizontal lines 621 and 622 are actually a straight line, in the example illustrated in FIG. 6F, the horizon 621 in the left side area 601 and the horizon 622 in the right side area 602 cannot be recognized as one straight line but are slightly mismatched. By monitoring such a display, the user can recognize that the digital camera 100 is not horizontally held. The user can capture an image in which the horizontal line is horizontally reflected by imaging a subject after adjusting the orientation of the digital camera 100 to an orientation with which the horizons 621 and 622 can be visually recognized as one straight line.

In step S410, the system control unit 50 determines whether the shutter button 61 is half-pressed and SW1 is set to ON. When SW1 is set to ON (YES in step S410), the processing proceeds to step S411. On the other hand, when SW1 is not set to ON (NO in step S410), the processing proceeds to step S415.

In step S411, the system control unit 50 performs AF on the center portion of the active frame 603 (position indicated by the center marker 605) without canceling the 2-area enlargement display. When the focusing state is obtained as a result of AF, focus is fixed (AF lock) while the ON state of SW1 is maintained.

In step S412, the system control unit 50 determines whether the ON state of SW1 is maintained. When the ON state of SW1 is maintained (YES in step S412), the processing proceeds to step S413. On the other hand, when the ON state of SW1 is not maintained (NO in step S412), the system control unit 50 cancels the AF lock state. Then, the processing returns to step S402.

In step S413, the system control unit 50 determines whether the shutter button 61 is fully pressed and SW2 is set to ON. When SW2 is set to ON (YES in step S413), the processing proceeds to step S414. On the other hand, when SW2 is not set to ON (NO in step S413), the processing returns to step S412.

In step S414, the system control unit 50 performs the above-described imaging processing (a series of operations in the imaging processing from signal reading from the imaging unit 22 to image file writing in the recording medium 200). The image to be captured by the imaging processing is not the ranges subjected to the 2-area enlargement display but the image of the imaging range. Upon completion of the imaging processing, the processing returns to step S402. Alternatively, the processing may not return to step S402 upon completion of the imaging processing. The system control unit 50 may cancel the 2-area enlargement display and return to live view display (non-scaled display, display at the normal magnification ratio) of the entire imaging range (i.e., the processing may proceed to step S301) instead.

In step S415, the system control unit 50 determines whether a touch operation on the touch panel 70*a* is enabled. A touch operation on the touch panel 70*a* can be enabled or disabled from a setting menu screen by the user. When a touch operation is enabled, the user can perform various types of operations through a touch operation. When a touch operation is disabled, it is possible to prevent an erroneous operation due to a wrong touch and reduce the power consumption by deactivating a touch detection operation on the touch panel 70*a*. When a touch operation is enabled (YES in step S415), the processing proceeds to step S418. On the other hand, when a touch operation is disabled (NO in step S415), the processing proceeds to step S416.

In step S416, the system control unit 50 determines whether the 2-area enlargement end button is pressed. According to the present exemplary embodiment, the 2-area enlargement end button is the Q button 70*c*. When the Q button 70*c* is pressed (YES in step S416), the processing proceeds to step S417. On the other hand, when the Q button 70*c* is not pressed (NO in step S416), the processing returns to step S402. Then, the system control unit 50 repeats the subsequent processing.

In step S417, the system control unit 50 cancels the 2-area enlargement display, resumes the entire live view image display, and ends the 2-area enlargement processing. Then, the processing proceeds to step S301 illustrated in FIG. 3.

Figure 7B:
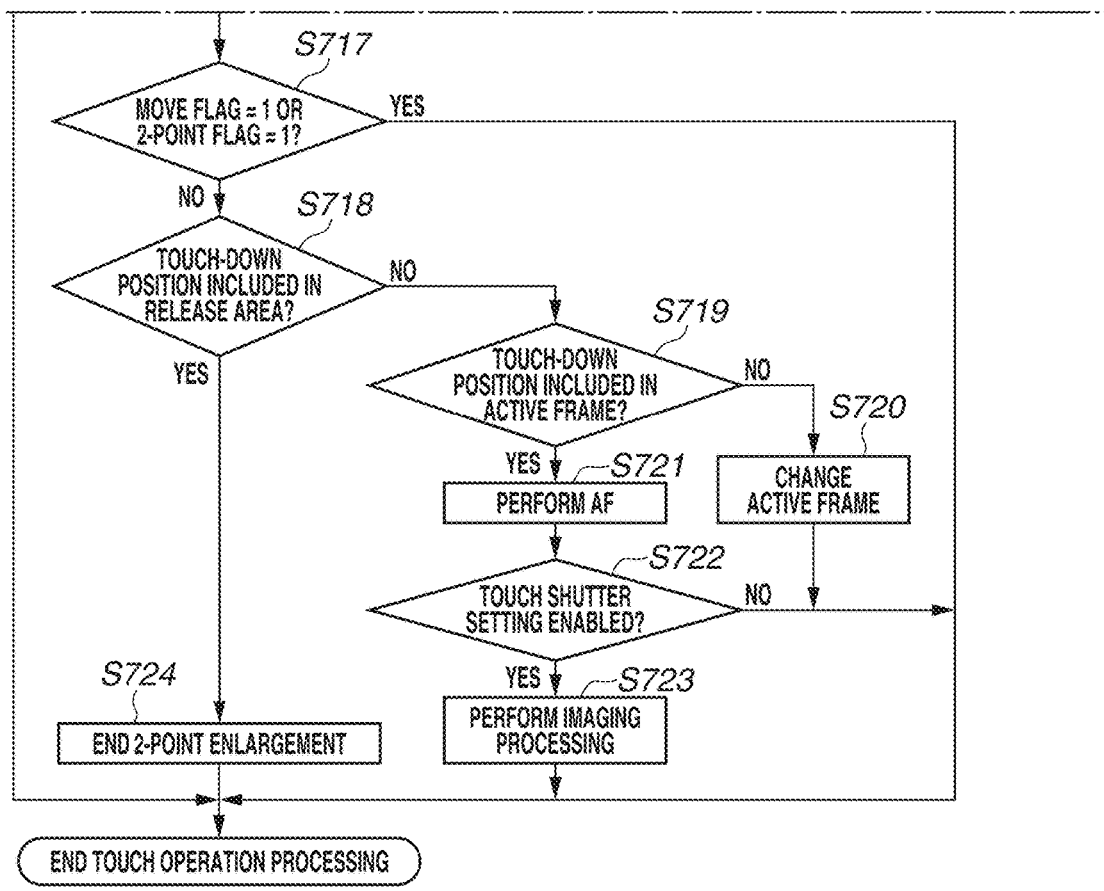

In step S418, the system control unit 50 performs the touch operation processing according to a touch operation. The touch operation processing will be described in detail below with reference to FIGS. 7A and 7B (collectively, FIG. 7).

In step S419, the system control unit 50 determines whether the 2-area enlargement display is completed in the above-described touch operation processing. When the 2-area enlargement display is completed (YES in step S419), the processing proceeds to step S417. On the other hand, the 2-area enlargement display is not completed (NO in step S419), the processing returns to step S402.

FIG. 7 is a flowchart illustrating the above-described touch operation processing in step S418 as processing performed in response to a touch operation during the 2-area enlargement processing. This processing is implemented when the system control unit 50 loads a program recorded in the nonvolatile memory 56 into the system memory 52 and then executes the program.

In step S701, the system control unit 50 determines whether a touch-down on the touch panel 70*a* is performed. This step also determines whether a touch-down on the first point is performed on the touch panel 70*a*. When a touch-down is performed (YES in step S701), the processing proceeds to step S702. On the other hand, when a touch-down is not performed (NO in step S701), the system control unit 50 ends the touch operation processing. Then, the processing proceeds to step S418 illustrated in FIG. 4.

In step S702, the system control unit 50 stores in the system memory 52 the input coordinates (touch-down position) of a touch-down on the touch panel 70*a*. The information to be stored in the system memory 52 is not limited to the input coordinates, and may be any information as long as it makes it possible to determine which of the left side area 601 and the right side area 602 the touch-down position is included in.

In step S703, the system control unit 50 determines whether a touch-move is performed. When the touch position has moved over a distance exceeding a threshold value from the touch-down position without detecting a touch-up (while in contact with the touch panel 70*a*), the system control unit 50 determines that a touch-move has been performed. When a touch-move has been performed (YES in step S703), the processing proceeds to step S704. On the other hand, when a touch-move has not been performed (NO in step S703), the processing proceeds to step S710.

In step S704, the system control unit 50 assigns 1 to a move flag variable allocated in the system memory 52. Processing in this step is not limited to the assignment to the move flag variable as long as information about a touch-move can be stored and used to determine whether a touch-move is performed.

In step S705, the system control unit 50 determines whether the moving direction of a touch-move is the vertical direction (upward or downward direction). When the amount of movement of the touch position from the touch-down position reaches a threshold value for touch-move or another threshold value for determining the moving direction, the system control unit 50 calculates the difference in coordinate value for each component between the touch-down position and the current touch position. The system control unit 50 compares the moving amount of the horizontal component (x component) with the moving amount of the vertical component (y component). When the moving amount of the vertical component (y component) is larger than the moving amount of the horizontal component (x component), the system control unit 50 determines that the moving direction is the vertical direction. On the other hand, when the moving amount of the horizontal component (x component) is larger than the moving amount of the vertical component (y component), the system control unit 50 determines that the moving direction is the horizontal direction. Alternatively, a threshold value 1 of the moving amount of the horizontal component (x component) and a threshold value 2 of the vertical component (y component) are provided. When the moving amount of the vertical component from the touch-down position reaches the threshold value 2 before the moving amount of the horizontal component therefrom reaches the threshold value 1, the system control unit 50 may determine that the moving direction is the vertical direction. In this determination method, when the moving amount of the horizontal component from the touch-down position reaches the threshold value 1 before the moving amount of the vertical component therefrom reaches the threshold value 2, the system control unit 50 may determine that the moving direction is the horizontal direction. When the system control unit 50 has once determined that the moving direction is the vertical direction, the system control unit 50 does not perform processing according to the horizontal movement component until a touch-up is performed even if the finger or pen horizontally moves. On the contrary, when the system control unit 50 has once determined that the moving direction is the horizontal direction, the system control unit 50 does not perform processing according to the vertical movement component until a touch-up is performed even if the finger or pen vertically moves. When the moving direction is the vertical direction (YES in step S705), the processing proceeds to step S706. On the other hand, when the moving direction is the horizontal direction (NO in step S705), the processing proceeds to step S707.

In step S706, in response to a move-up or move-down operation as a touch-move, the system control unit 50 vertically moves the display ranges of the left side area 601 and the right side area 602 in an associative way. In other words, when a move-up operation is performed as a touch-move, the system control unit 50 moves down the display ranges of the left side area 601 and the right side area 602 in an associative way (i.e., the image itself scrolls up). Accordingly, the display changes from the state illustrated in FIG. 6E to the state illustrated in FIG. 6D. On the contrary, when a move-down operation is performed as a touch-move, the system control unit 50 moves up the display ranges of the left side area 601 and the right side area 602 in an associative way (i.e., the image itself scrolls down). Accordingly, the display changes from the state illustrated in FIG. 6D to the state illustrated in FIG. 6E.

In step S707, in response to a horizontal move operation as a touch-move, the system control unit 50 determines whether the area with the non-active frame contacts (adjoins) the area with the active frame 603 in the direction in which the latter area is to be moved. For example, in the state illustrated in FIG. 8A, the display ranges of the left side area 601 and the right side area 602 are not in contact with each other in the entire imaging range (the left side indicator 611 and the right side indicator 612 are not in contact with each other and there is a gap therebetween). In other words, the left side imaging area and the right side imaging area respectively corresponding to the display ranges of the left side area 601 and the right side area 602 are separated from each other. In the state illustrated in FIG. 8C, the right side of the display range of the left side area 601 and the left side of the display range of the right side area 602 are in contact with each other in the entire imaging range (the left side indicator 611 and the right side indicator 612 are in contact with each other). In other words, the right side imaging area corresponding to the display range of the right side area 602 adjoins the right side of the left side imaging area corresponding to the display range of the left side area 601. Therefore, the live view image displayed in the left side area 601 and the live view image displayed in the right side area 602 become horizontally connected images. In this case, when a touch-move to the left is performed, the display range (corresponding imaging area) of the left side area 601 displayed with the active frame 603 is to be moved to the right. Since the display range of the right side area 602 adjoins the right side of the left side area 601, the result of the determination in step S707 is "YES". When the area with the non-active frame adjoins the area with the active frame 603 in the direction in which the latter is to be moved (YES in step S707), the processing proceeds to step S709. On the other hand, when the area with the non-active frame does not adjoin the area with the active frame 603 in the direction in which the latter is to be moved (NO in step S707), the processing proceeds to step S708.

In step S708, in response to a horizontal move operation as a touch-move, the system control unit 50 horizontally moves the display range of the area (imaging area corresponding to the range to be displayed) with the active frame 603. More specifically, when a rightward move operation is performed as a touch-move, the system control unit 50 moves to the left the display range (corresponding imaging area) of the area with the active frame 603 (i.e., the image itself scrolls to the right). On the contrary, when a leftward move operation is performed as a touch-move, the system control unit 50 moves to the right the display range (corresponding imaging area) of the area with the active frame 603 (i.e., the image itself scrolls to the left). The display range (corresponding imaging area) to be changed here is the area with the active frame 603 regardless of which of the left side area 601 and the right side area 602 the touch-down position and the current touch position are included in. For example, when a touch-move to the left is performed with a finger F in the state illustrated in FIG. 8A, the display changes to the state illustrated in FIG. 8B. More specifically, the system control unit 50 moves to the right the display range of the left side area 601 with the active frame 603 (i.e., the partial live view image moves to the left). Since the display ranges of the left side area 601 and the right side area 602 are not in contact with each other in the imaging range, the system control unit 50 does not move the display range of the right side area 602 with the non-active frame.

When a touch-move is performed further to the left without detaching the finger F in the state illustrated in FIG. 8B, the system control unit 50 further moves to the right the display range of the left side area 601. As a result, the display range of the left side area 601 comes in contact with the display range of the right side area 602 (the left side indicator 611 and the right side indicator 612 contact each other), resulting in the state illustrated in FIG. 8D. In this state, even if a touch-move is performed further to the left without detaching the finger F, the system control unit 50 moves neither the display range of the left side area 601 nor the display range of the right side area 602. More specifically, when the display range of the area with the active frame 603 comes in contact with the display range of the area with the non-active frame during the processing for horizontally moving the former display range, the system control unit 50 does not move the former display range even if an instruction for movement in the direction of the display range of the area with the non-active area is issued. In other words, when the display range of the area with the active frame 603 abuts against the display range of the other area while moving the former display range, the movement stops. The above-described processing enables preventing unintentional change of the adjusted display range of the area with the non-active frame. When the finger F is once detached and then a touch-move in the same direction is performed again, the system control unit 50 performs the processing in step S709 (described below) to move the display ranges of the left side area 601 and the right side area 602 in an associative way. Also when the display range of the area with the active frame 603 abuts against the display range of the other area while moving the former display range during a touch-move, the system control unit 50 may move the display ranges of the left side area 601 and the right side area 602 in an associative way without stopping the movement. In step S709, in response to a horizontal move operation as a touch-move, the system control unit 50 horizontally moves the display range of the area with the active frame 603 and the display range of the area with the non-active frame in an associative way. In other words, in response to a horizontal move operation as a touch-move, the system control unit 50 changes the positions of the imaging areas respectively corresponding to the display ranges of the left side area 601 and the right side area 602. More specifically, when a rightward move operation is performed as a touch-move, the system control unit 50 moves to the left the display range of the area with the active frame 603 and the display range of the area with the non-active frame in an associative way. However, when the display range of the area with the non-active frame has reached the left end of the entire imaging range, the display range cannot be moved any further to the left, and therefore the system control unit 50 does not move the display range even if an instruction for further movement to the left is issued. On the contrary, when a leftward move operation is performed as a touch-move, the system control unit 50 moves to the right the display range of the area with the active frame 603 and the display range of the area with the non-active frame in an associative way. However, when the display range of the area with the non-active frame has reached the right end of the entire imaging range, the display range cannot be moved any further to the right, and therefore the system control unit 50 does not move the display range even if an instruction for further movement to the right is issued. For example, when a touch-move to the left is performed in the state illustrated in FIG. 8C, the display changes to the state illustrated in FIG. 8D. More specifically, the system control unit 50 moves to the right the display ranges of the left side area 601 and the right side area 602 (i.e., the partial live view image moves to the left). The above-described processing allows the user to perform an operation for moving the display range of the left side area 601 with the active frame 603 to a further rightward position than the display range of the non-active right side area 602 before the movement without troublesome operation and confusion. More specifically, when moving the display range of the left side area 601 to a further rightward position than the display range of the right side area 602 before the movement, the user does not need to perform an operation for changing the active frame 603 to the right side area 602 and moving the display range of the right side area 602. In addition, the positional relation between the display ranges of the right and left areas is not reversed, for example, the display range of the left side area 601 is not positioned further to the right than the display range of the right side area 602. This allows the user to perform operations without confusion. Similar effects can also be obtained when the right side area 602 is supplied with the active frame 603 and when moving the display range of the right side area 602 to a further leftward position than the display range of the non-active left side area 601 before the movement. In step S710, the system control unit 50 determines whether a touch-down on the second point is detected. When the second point is touched after a certain time period has elapsed since one point was touched, or when two points are simultaneously touched in a state where no point is touched, the results of the determinations in steps S701 and S710 are "YES". When a touch-on is detected on two touch positions, i.e., when a multi-touch is detected (YES in step S710), the processing proceeds to step S711. On the other hand, when a multi-touch is not detected (NO in step S710), the processing proceeds to step S716.

In step S711, the system control unit 50 assigns 1 to a 2-point flag variable allocated in the system memory 52. Processing in this step is not limited to the assignment to the 2-point flag variable as long as information about the detection of a touch-on on two touch positions (a state where a multi-touch is performed) is indicated. Other information that makes it possible to determine whether a touch-on is detected on two touch positions may be stored.

In step S712, the system control unit 50 determines whether both touch positions on two points when a touch-down on the second point is detected are included in either the left side area 601 or the right side area 602. When both touch positions on the two points when a touch-down on the second point is detected are included in either the left side area 601 or the right side area 602, as illustrated in FIG. 8G (YES in step S712), the processing proceeds to step S713. On the other hand, when the touch positions on the first and the second points are included in different areas, as illustrated in FIG. 8E (NO in step S712), the processing proceeds to step S714.

In step S713, the system control unit 50 changes the magnifications of the LV images subjected to 2-area enlargement in response to a pinch operation. When a pinch-out is performed as a pinch operation, the system control unit 50 increases the respective magnifications of the LV images displayed in the left side area 601 and the right side area 602 and makes the magnifications identical (enlarges the LV images displayed in the left side area 601 and the right side area 602 in an associative way). When a pinch-in is performed as a pinch operation, the system control unit 50 decreases the respective magnifications of the LV images displayed in the left side area 601 and the right side area 602 and makes the magnifications identical. For example, in a case where the touch positions of the first and the second points when a touch-down on the second point is performed are included in the left side area 601, as illustrated in FIG. 8G, the system control unit 50 decreases the respective magnifications of the LV images, as illustrated in FIG. 8H, through a subsequent pinch-in in which the touch positions on the two points come close to each other.

In step S714, the system control unit 50 moves the display ranges of the left side area 601 and the right side area 602 in response to a pinch operation in the near or far direction (so that the gap between the two points decreases or increases, respectively). When a pinch-in is performed as a pinch operation, the system control unit 50 moves the display ranges of the left side area 601 and the right side area 602 in an associative way in the far direction centering on the middle point between the two points before the movement. However, when the display ranges of the left side area 601 and the right side area 602 have reached an end of the entire imaging range, the system control unit 50 does not move the display range having reached the end even if an instruction for further movement by a pinch-in is issued but moves only the display range not having reached an end. When a pinch-out is performed as a pinch operation, the system control unit 50 moves the display ranges of the left side area 601 and the right side area 602 in an associative way in the near direction centering on the middle point between the two points before the movement. When the display ranges of the left side area 601 and the right side area 602 are in contact with each other, the system control unit 50 does not move the display ranges even if an instruction for further movement by a pinch-out is issued. For example, when the touch position of the first point is in the left side area 601 and the touch position of the second point is in the right side area 602 (i.e., when the two points are in different areas), as illustrated in FIG. 8E, a subsequent pinch-out in which the touch positions of two points move away from each other changes the display to the state illustrated in FIG. 8F. More specifically, the system control unit 50 moves the display ranges of the left side area 601 and the right side area 602 in an associative way in the near direction centering on the middle point between the two points before the movement. As a result, the distance between the left side indicator 611 and the right side indicator 612 illustrated in FIG. 8E decreases like the left side indicator 611 and the right side indicator 612 illustrated in FIG. 8F. The moving direction of the display ranges according to a pinch operation may be the reverse direction.

In step S715, the system control unit 50 determines whether a touch-up on one of the two touch points of a multi-touch is performed. When a touch-up on one point is performed (YES in step S715), the processing proceeds to step S716. On the other hand, when a touch-up on one point is not performed (a multi-touch is continued) (NO in step S715), the processing returns to step S712.

In step S716, the system control unit 50 determines whether a touch-up is performed for all of points where a touch-on was detected (touch-up on all points is performed). When a touch-up on all points is performed (YES in step S716), the processing proceeds to step S717. On the other hand, when this condition is not met (when a touch operation on one point is continued) (NO in step S716), the processing returns to step S703.

In step S717, the system control unit 50 determines whether the move flag variable is 1 or whether the 2-point flag variable is 1. When the move flag variable is 1 or the 2-point flag variable is 1 (YES in step S717), the system control unit 50 ends the touch operation processing. On the other hand, when this condition is not met (NO in step S717), the processing proceeds to step S718. When the move flag variable is 1 or the 2-point flag variable is 1, the touch operation is an operation for moving the display ranges or an operation for changing the magnifications as described above. Therefore, the system control unit 50 leaves the position of the active frame 603 unchanged from the position before the touch operation.

In step S718, the system control unit 50 determines whether the input coordinates of a touch-down (touch-down position) stored in the system memory 52 in step S702 are included in a release area. When the input coordinates are included in the release area (YES in step S718), the processing proceeds to step S724. On the other hand, when the input coordinates are not included in the release area (NO in step S718), the processing proceeds to step S719. The result of the determination in step S718 is "YES" when a touch-up is performed without neither a touch-move nor a multi-touch after a touch-down, i.e., when a tap operation on a release area is performed. The release area is superimposed on the LV image of the area with the non-active frame so that the release area does not disturb the visual recognition of the LV image of the area with the active frame 603. According to the present exemplary embodiment, the display ranges of the enlarged position guide 610 and the guide 606 are assumed to be release areas. Only the guide 606 may be assumed to be a release area. The guide 606 is a touch icon including a text indicating a release area ("Cancel").

In step S719, the system control unit 50 determines whether the input coordinates of a touch-down (touch-down position) stored in the system memory 52 in step S702 are included in the area with the active frame 603. When the touch-down position is included in the area with the active frame 603 (YES in step S719), the processing proceeds to step S721. On the other hand, when the touch-down position is not included in the area (NO in step S719), the processing proceeds to step S720.

In step S720, the system control unit 50 moves the active frame 603 from the area displayed with the active frame 603 before the touch operation to the other area. In this way, the area to be supplied with the active frame 603 can be changed by performing a tap operation on the non-active area.

In step S721, the system control unit 50 performs AF on the center portion of the active frame 603 (position indicated by the center marker 605) without canceling the 2-area enlargement display. Instead of AF on the center portion, the system control unit 50 may perform AF on the subject at the touch-down position or touch-up position. In this way, an instruction for executing AF may be issued by performing a tap operation on the area with the active frame 603.

In step S722, the system control unit 50 determines whether the touch shutter setting is enabled (ON). The touch shutter setting can be enabled (ON) or disabled (OFF) in advance from the setting menu screen by the user. When the touch shutter setting is enabled (ON) (YES in step S722), the processing proceeds to step S723. In step S723, the system control unit 50 performs the imaging processing in response to a touch operation on the live view image. When the touch shutter setting is disabled (OFF) (NO in step S722), the system control unit 50 does not perform the imaging processing even if a touch operation on the live view image is performed. The touch shutter setting may be common to the entire live view screen and the 2-area enlargement display. Alternatively, the touch shutter setting may be enabled (ON) or disabled (OFF) as a 2-area enlargement display setting which is a different setting from the entire live view screen. When the touch shutter setting is a different setting from the entire live view screen, the touch shutter setting may be set to ON in the entire live view screen and set to OFF in the 2-area enlargement display. Conversely, the touch shutter setting may be set to OFF in the entire live view screen and set to ON in the 2-area enlargement display. Since the entire live view screen is an imaging standby screen displayed first when the camera 100 is activated in the live view imaging mode, the user may hang the camera 100 from the neck using a neck strap in a state where the entire live view is displayed thereon. In this case, by turning OFF the touch shutter in the entire live view, it is possible to prevent unintentional imaging due to a wrong touch where the touch panel 70a touches the abdomen. On the other hand, the 2-area enlargement display is not an imaging standby screen displayed first when the camera 100 is activated in the live view imaging mode. Therefore, the user seldom hangs the camera 100 from the neck using a neck strap in a state where the 2-area enlargement display is thereon. Therefore, a wrong touch where the touch panel 70a touches the abdomen hardly takes place. Setting the touch shutter to ON enables giving priority to the convenience of imaging by an intentional touch. When the imaging processing is set to be performed in response to a touch operation (when the touch shutter setting is ON) (YES in step S722), the processing proceeds to step S723. On the other hand, when the touch shutter setting is OFF (NO in step S722), the system control unit 50 ends the touch operation processing. Then, the processing proceeds to step S419 illustrated in FIG. 4.

In step S723, the system control unit 50 performs the above-described imaging processing (a series of operations in the imaging processing from signal reading from the imaging unit 22 to image file writing in the recording medium 200). An imaging instruction can be issued by a touch-up in this way.

In step S724, the system control unit 50 cancels the 2-area enlargement display, resumes the entire live view image display, and ends the 2-area enlargement processing and the touch operation processing. When the processing in step S724 is performed, the processing proceeds to step S419 and then to step S417 illustrated in FIG. 4. In step S417, the system control unit 50 performs the 2-area enlargement processing, and the processing proceeds to step S301 illustrated in FIG. 3. According to the present exemplary embodiment, it is possible to move, according to a touch operation, the display ranges, change the magnifications, change the active area, and perform AF and imaging in the 2-area enlargement display, and then cancel the 2-area enlargement display with good operability. The user can perform a touch operation with smaller force than in an operation for rotating a dial operation member as a hardware key and an operation for pressing a push button. Therefore, the possibility that such operation force changes the orientation of the digital camera 100 is low (the influence of an operation on the orientation is small). Therefore, according to the present exemplary embodiment in which various operations in the 2-area enlargement display can be performed through touch operations, it is possible to adjust with good accuracy the orientation by utilizing the 2-area enlargement display without adversely affecting the apparatus orientation adjustment with operation force for operating the 2-area enlargement display.

In the above-described example processing in step S714, the system control unit 50 performs processing corresponding to a pinch operation when touch positions on the first and the second points are included in different areas. In this case, when a touch-move for moving the touch positions of two points in the same direction is performed instead of a pinch operation, the system control unit 50 may move the display ranges of the two areas in the direction according to the touch-move. More specifically, when a touch-move for moving the touch positions of two points to the left is performed, the system control unit 50 moves the display ranges of the two areas to the right. When a touch-move for moving the touch positions of two points to the right is performed, the system control unit 50 moves the display ranges of the two areas to the left. In this case, it is desirable to move the display ranges of the left side area 601 and the right side area 602 in an associative way while maintaining a constant gap therebetween.

In the above-described example processing in steps S712 to S714, the system control unit performs different processing (S713 or S714) between a case where the touch positions of the first and the second points are included in different areas and a case where the touch positions thereof are included in the same area. However, the processing is not limited thereto. The system control unit 50 may perform processing for changing the magnifications of the two areas in an associative way (described in step S713) in response to a pinch operation regardless of whether the touch positions of the first and the second points are included in different areas or in the same area. In this case, the processing in steps S712 and S714 is omitted, i.e., upon completion of step S711 or when the result of the determination in step S715 is "NO", the processing proceeds to step S713.

In the above-described example processing, functions are assigned to operations with a touch-move and multi-touch. Therefore, to implement a touch-down together with these operations, the system control unit 50 does not issue AF and imaging instructions when only a touch-down is performed but performs AF and imaging in response to a touch-up. However, when functions are not assigned to operations with a touch-move and multi-touch, the system control unit 50 may perform AF and imaging processing in response to a touch-down (without waiting for a touch-up). In this case, when the system control unit 50 determines that a touch-down is performed (YES in step S701), the processing proceeds to step S718. Then, the system control unit 50 performs the processing in steps S718 to S724 (performs AF and imaging, changes the active area, and ends the 2-area enlargement display) in response to a touch-down. The above-described various control processing to be performed by the system control unit 50 may be performed by one hardware component, and the entire apparatus may be controlled by a plurality of hardware components which share processing.

While the present disclosure has specifically been described based on exemplary embodiments, the present disclosure is not limited thereto but can be modified in diverse ways without departing from the spirit and scope thereof. The above-described exemplary embodiments are to be considered as illustrative and not restrictive of the scope of the present disclosure. These exemplary embodiments can be suitably combined.

Although, in the above-described exemplary embodiments, the present disclosure is applied to the digital camera 100, the present disclosure is not limited thereto. The present disclosure is also applicable to an imaging control apparatus capable of performing the 2-area enlargement display. More specifically, the present disclosure is applicable to a personal computer and a personal digital assistant (PDA) having a camera function, a mobile phone terminal with a camera, a portable image viewer with a camera, a music player with a camera, a game machine with a camera, an electronic book reader with a camera, and so on. The present disclosure is also applicable to a tablet terminal with a camera, a smart phone with a camera, a household appliance and onboard apparatus having a camera function and a display. The present disclosure is also applicable to a smart phone, a tablet personal computer (PC), a desktop PC, etc. which receive and display a live view image captured by a digital camera, etc. via wired or wireless communication and remotely controls the digital camera (including a network camera).

The above-described 2-area enlargement display is also applicable to a playback image. More specifically, an electronic apparatus, not limited to a camera, is allowed to perform 2-area enlargement display for displaying respective partial images in a first and a second area at horizontally different positions in the entire image, side by side on a display unit. Even in this case, the above-described various operations are applicable.

According to the above-described exemplary embodiments, it is possible to achieve processing in 2-area enlargement display with high operability through touch operations.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-254229, filed Dec. 27, 2016, which is hereby incorporated by reference herein in its entirety.

What is claimed is:

1. An imaging control apparatus comprising:
a touch detector configured to detect a touch operation on a display unit; and
at least one memory and at least one processor which function as:
a display control unit configured to perform 2-area enlargement display for displaying live view images respectively captured in a first and a second imaging areas at horizontally different positions by an imaging unit, side by side on the display unit; and
a control unit configured to perform control,
upon a move operation for movement in a horizontal direction while in contact with the display unit, when the first and the second imaging areas respectively corresponding to ranges displayed in a first and a second display areas in the 2-area enlargement display are separated from each other, to change a position of the first imaging area and not to change a position of the second imaging area in response to the move operation, and
upon the move operation in the horizontal direction, when the second imaging area adjoins the first imaging area in a direction in which the first imaging area is to be moved by the move operation, to change the positions of the first and the second imaging areas in response to the move operation.

2. The imaging control apparatus according to claim 1, wherein, upon the move operation in the vertical direction, the control unit performs control to change the positions of the first and the second imaging areas in response to the move operation regardless of whether the first and the second imaging areas adjoin each other.

3. The imaging control apparatus according to claim 1, wherein, upon a pinch-in or pinch-out by a multi-touch in the first display area, the control unit performs control to change magnifications of live view images respectively displayed in the first and the second display areas in an associative way.

4. The imaging control apparatus according to claim 1, wherein, upon a multi-touch where a touch on a first point is made in the first display area and a touch on a second point is made in the second display area, the control unit performs control to move the positions of the first and the second imaging areas in a mutually approaching direction or in a mutually separating direction in response to a pinch-in or pinch-out by the multi-touch, respectively.

5. The imaging control apparatus according to claim 1, wherein, when the second imaging area adjoins the first imaging area in a direction in which the first imaging area is to be moved by the move operation as a result of changing the position of the first imaging area and not changing the position of the second imaging area in response to the move operation in the horizontal direction, the control unit performs control not to change the positions of the first and the second imaging areas when the move operation is further performed without a release of the touch in the move operation.

6. The imaging control apparatus according to claim 1, wherein the at least one memory and the at least one processor further function as a selection unit configured to select either the first or the second display area.

7. The imaging control apparatus according to claim 6, wherein, upon the move operation in the horizontal direction, when the first and the second imaging areas respectively corresponding to the ranges respectively displayed in the first and the second display areas in the 2-area enlargement display are separated from each other, the control unit performs control to change the position of the imaging area corresponding to the display area selected by the selection unit regardless of the position of the touch in the move operation.

8. The imaging control apparatus according to claim 6, wherein, in response to a specific touch operation not accompanied by the move operation on the area not selected by the selection unit out of the first and the second display areas, the control unit performs control to change the display area selected by the selection unit.

9. The imaging control apparatus according to claim 8, wherein the specific touch operation is an operation in which a touch is made and, accompanied by neither the move operation nor a multi-touch, then released.

10. The imaging control apparatus according to claim 6, wherein, in response to a specific touch operation not accompanied by the move operation on the area selected by the selection unit out of the first and the second display areas, the control unit performs control to perform auto focus on a subject displayed in the display area selected by the selection unit.

11. The imaging control apparatus according to claim 6, wherein, in response to a specific touch operation not accompanied by the move operation on the area selected by the selection unit out of the first and the second display areas, the control unit performs control to perform imaging processing on an image to be recorded as an image file.

12. The imaging control apparatus according to claim 1, wherein, in response to a predetermined touch operation, the control unit performs control to cancel the 2-area enlargement display and display an entire live view image captured by the imaging unit on the display unit.

13. A method for controlling an imaging control apparatus, the method comprising:
performing display control to perform 2-area enlargement display for displaying live view images respectively captured in a first and a second imaging areas at horizontally different positions by an imaging unit, side by side on a display unit;
detecting a touch operation on the display unit; and
performing control,
upon a move operation for movement in a horizontal direction while in contact with the display unit, when the first and the second imaging areas respectively corresponding to ranges displayed in a first and a second display areas in the 2-area enlargement display are separated from each other, to change a position of the first imaging area and not to change a position of the second imaging area in response to the move operation, and
upon the move operation in the horizontal direction, when the second imaging area adjoins the first imaging area in a direction in which the first imaging area is to be moved by the move operation, to change the positions of the first and the second imaging areas in response to the move operation.

14. A non-transitory computer-readable storage medium storing a program for causing a computer to execute the method for controlling an imaging control apparatus according to claim 13.

15. An electronic apparatus comprising:
a touch detector configured to detect a touch operation on a display unit; and
at least one memory and at least one processor which function as:
a display control unit to perform 2-area enlargement display for displaying respective partial images in a first and a second areas at horizontally different positions in an entire image, side by side on the display unit; and
a control unit configured to perform control,
upon a move operation for movement in a horizontal direction while in contact with the display unit, when positions of the first and the second areas in the entire image respectively corresponding to ranges displayed in a first and a second display areas in the 2-area enlargement display are separated from each other, to change the position of the first area and not to change the position of the second area in response to the move operation, and
upon the move operation in the horizontal direction, when the second area adjoins the first area in a direction in which the first area is to be moved by the move operation, to change the positions of the first and the second areas in response to the move operation.

16. A method for controlling an electronic apparatus, the method comprising:
performing display control to perform 2-area enlargement display for displaying respective partial images in a first and a second areas at horizontally different positions in an entire image, side by side on a display unit;
detecting a touch operation on the display unit; and
performing control,
upon a move operation for movement in a horizontal direction while in contact with the display unit, when positions of the first and the second areas in the entire image respectively corresponding to ranges displayed in a first and a second display areas in the 2-area enlargement display are separated from each other, to change the position of the first area and not to change the position of the second area in response to the move operation, and
upon the move operation in the horizontal direction, when the second area adjoins the first area in a direction in which the first area is to be moved by the move operation, to change the positions of the first and the second areas in response to the move operation.

17. A non-transitory computer-readable storage medium storing a program for causing a computer to execute the method for controlling an electronic apparatus according to claim 16.

* * * * *